United States Patent
Feng et al.

(10) Patent No.: US 12,388,987 B2
(45) Date of Patent: Aug. 12, 2025

(54) PRECODING ENCODING METHOD AND ENCODER FOR QP ADJUSTMENT

(71) Applicant: HUAWEI TECHNOLOGIES CO., LTD., GuangDong (CN)

(72) Inventors: Junkai Feng, Xi'an (CN); Bo Qu, Xi'an (CN); Liping Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 250 days.

(21) Appl. No.: 17/855,220

(22) Filed: Jun. 30, 2022

(65) Prior Publication Data

US 2022/0337820 A1   Oct. 20, 2022

Related U.S. Application Data

(63) Continuation of application No. PCT/CN2020/138963, filed on Dec. 24, 2020.

(30) Foreign Application Priority Data

Dec. 31, 2019 (CN) .......................... 201911409793.1

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/176* (2014.11); *H04N 19/182* (2014.11)

(58) Field of Classification Search
CPC .... H04N 19/11; H04N 19/105; H04N 19/176; H04N 19/182
See application file for complete search history.

(56) References Cited

U.S. PATENT DOCUMENTS

| 9,774,871 B2 | 9/2017 | Jung et al. |
| 2011/0150076 A1 | 6/2011 | Wang et al. |

(Continued)

FOREIGN PATENT DOCUMENTS

| CN | 101779468 A | 7/2010 |
| CN | 102172024 A | 8/2011 |

(Continued)

*Primary Examiner* — Kyle M Lotfi
(74) *Attorney, Agent, or Firm* — Rimon PC

(57) ABSTRACT

An encoding method and an encoder are provided to improve image compression performance. An embodiment of the encoding method determines an encoding quantization parameter, QP, and precodes a to-be-encoded block using the encoding QP to obtain encoding result information. The encoding QP is then adjusted based on the encoding result information, and then real encoding is performed on the to-be-encoded block by using an adjusted encoding QP. An embodiment of the encoder includes a bit rate control module to determine a first QP, and a precoding module to precode a to-be-encoded block using the QP to obtain precoding result information. The encoder further includes another bit rate control module to adjust the QP based on the precoding result information to obtain a second QP, and a real encoding module to encode the to-be-encoded block using the second QP.

19 Claims, 12 Drawing Sheets

(51) Int. Cl.
*H04N 19/176* (2014.01)
*H04N 19/182* (2014.01)

(56) References Cited

U.S. PATENT DOCUMENTS

| | | | |
|---|---|---|---|
| 2015/0208069 A1* | 7/2015 | Zheng | H04N 19/154 |
| | | | 375/240.03 |
| 2015/0326857 A1 | 11/2015 | Zhang et al. | |
| 2018/0343471 A1* | 11/2018 | Jacobson | H04N 19/152 |
| 2019/0132591 A1 | 5/2019 | Zhang et al. | |

FOREIGN PATENT DOCUMENTS

| | | |
|---|---|---|
| CN | 107864379 A | 3/2018 |
| CN | 108200429 A | 6/2018 |
| CN | 108574841 A | 9/2018 |
| CN | 108989814 A | 12/2018 |
| CN | 110267037 A | 9/2019 |
| CN | 110324622 A | 10/2019 |
| WO | 2006119436 A2 | 11/2006 |
| WO | 2015143671 A1 | 10/2015 |

* cited by examiner

TO FIG. 10B

PRECODING ENCODING METHOD AND ENCODER FOR QP ADJUSTMENT

CROSS-REFERENCE TO RELATED APPLICATIONS

This application is a continuation of International Application No. PCT/CN2020/138963, filed on Dec. 24, 2020, which claims priority to Chinese Patent Application No. 201911409793.1, filed on Dec. 31, 2019. The disclosures of the aforementioned applications are hereby incorporated by reference in their entireties.

TECHNICAL FIELD

This application relates to the image processing field, and in particular, to an encoding method and an encoder.

BACKGROUND

Video image applications have, in recent years, been improved in a plurality of dimensions (such as resolution and frame rate), which has resulted in a significant rise in the amount of data processed by video processing systems. The bandwidth, power consumption, and costs of the video processing system have greatly increased. To effectively reduce the bandwidth, the power consumption, and the costs of the video processing system, a compression technology is applied to the video processing system.

The compression technology can effectively reduce the memory and bandwidth requirements of the video processing system, and reduce the cost of the video processing system. Compared with lossless compression, lossy compression without affecting image quality usually has a higher compression rate, and can reduce more memory and bandwidth use. Therefore, it is very important to optimize a compression architecture and increase compression efficiency without affecting image quality.

There are many types of compression architectures in the conventional technology. Compression performance of these architectures is not high, and still needs to be optimized.

SUMMARY

Embodiments of this application provide an encoding method and an encoder, to improve image compression performance.

According to a first aspect, an embodiment of this application provides an encoding method, including: determining a first encoding quantization parameter (QP); precoding the to-be-encoded block by using the first encoding QP to obtain precoding result information; adjusting the first encoding QP based on the precoding result information to obtain a second encoding QP; and performing real encoding on the to-be-encoded block by using the second encoding QP.

In this embodiment of this application, the to-be-encoded block is first precoded by using the first encoding QP, and the first encoding QP is adjusted based on the precoding result information to obtain the second encoding QP. Then, real encoding is performed on the to-be-encoded block by using the second encoding QP. The first encoding QP is adjusted based on the precoding result information, so that a more refined bit rate control can be implemented. A bit rate is properly used to transfer image data with better quality, to improve image compression performance.

In a possible implementation, the precoding the to-be-encoded block by using the first encoding QP to obtain precoding result information includes: precoding the to-be-encoded block by using the first encoding QP in each of a plurality of prediction modes to obtain precoding result information corresponding to the prediction mode. Before the adjusting the first encoding QP based on the precoding result information, the method further includes: selecting an optimal prediction mode from the plurality of prediction modes. The adjusting the first encoding QP based on the precoding result information to obtain a second encoding QP includes: adjusting the first encoding QP based on encoding result information corresponding to the optimal prediction mode to obtain the second encoding QP. The performing real encoding on the to-be-encoded block by using the second encoding QP includes: performing real encoding on the to-be-encoded block by using the second encoding QP in the optimal prediction mode.

In this embodiment of this application, the to-be-encoded block may be precoded in the plurality of prediction modes, to determine the optimal prediction mode. Then, the first encoding QP is adjusted based on the precoding result information corresponding to the optimal prediction mode, and real encoding is performed on the to-be-encoded block by using the adjusted encoding QP in the optimal prediction mode. The bit rate is properly used to transfer image data with better quality, to improve image compression performance.

In a possible implementation, before the determining a first encoding QP, the method further includes: selecting at least one optimal spatial-domain prediction mode from a plurality of spatial-domain prediction modes, and selecting at least one optimal frequency domain prediction mode from a plurality of frequency domain prediction modes, where the at least one optimal spatial-domain prediction mode is at least one spatial-domain prediction mode with a smallest encoding cost in the plurality of spatial-domain prediction modes, the at least one optimal frequency domain prediction mode is at least one frequency domain prediction mode with a smallest encoding cost in the plurality of frequency domain prediction modes, and different prediction modes correspond to different prediction reference directions and/or different prediction value calculation methods. The precoding the to-be-encoded block by using the first encoding QP in each of a plurality of prediction modes includes: performing spatial-domain precoding on the to-be-encoded block by using the first encoding QP in the at least one optimal spatial-domain prediction mode; and performing frequency domain precoding on the to-be-encoded block by using the first encoding QP in the at least one optimal frequency domain prediction mode.

Specifically, according to a preset cost calculation rule, the at least one optimal spatial-domain prediction mode may be selected from the plurality of spatial-domain prediction modes, and the at least one optimal frequency domain prediction mode may be selected from the plurality of frequency domain prediction modes. The preset cost calculation rule may be any one of the following: a sum of absolute differences of residuals, an encoding bit rate, and a rate-distortion cost. It should be understood that, the at least one spatial-domain prediction mode with a smallest encoding cost in the plurality of spatial-domain prediction modes may be at least one spatial-domain prediction mode that ranks high in the plurality of spatial-domain prediction modes in ascending order of encoding costs, or at least one spatial-domain prediction mode that ranks low in the plurality of spatial-domain prediction modes in descending order of encoding costs.

Because a transformation operation needs to be performed in frequency domain encoding, a prediction operation needs to be performed in a form of a block (that is, a reconstruction value in a current prediction block cannot be used as a prediction reference value for a subsequent pixel in the current prediction block). In this embodiment of this application, a plurality of prediction modes may be provided for each of a spatial-domain branch and a frequency domain branch. In this case, more refined point-level prediction (that is, the reconstruction value in the current prediction block may be used as the prediction reference value for the subsequent pixel in the current prediction block) can be performed without performing the prediction operation in a form of a block, to improve image compression performance through the more refined point-level prediction.

In a possible implementation, when the precoding the to-be-encoded block by using the first encoding QP, the method further includes: performing pixel reconstruction on the to-be-encoded block to obtain a reconstructed pixel of the to-be-encoded block in a precoding phase. After the precoding the to-be-encoded block by using the first encoding QP, the method further includes: precoding a next coding block of the to-be-encoded block with reference to the reconstructed pixel of the to-be-encoded block in the precoding phase.

Specifically, the next coding block and the to-be-encoded block are adjacent in an encoding time sequence, and an encoding time period of the to-be-encoded block is earlier than an encoding time period of the next coding block.

In this embodiment of this application, when the to-be-encoded block is precoded, the reconstructed pixel of the current coding block in the precoding phase may be used to precode the next coding block. To be specific, precoding of the next coding block is not limited to whether a real encoding phase of the to-be-encoded block is completed. After the precoding phase of the to-be-encoded block is completed, the next coding block may be precoded based on the reconstructed pixel of the current coding block in the precoding phase, without depending on a real encoding result of the to-be-encoded block. In this way, precoding of the next coding block may be performed synchronously with real encoding of the current to-be-encoded block, to increase encoding execution efficiency.

In a possible implementation, the precoding the to-be-encoded block by using the first encoding QP includes: predicting the to-be-encoded block to obtain residual information; quantizing the residual information by using the first encoding QP; and calculating an encoding cost based on quantized residual information. The to-be-encoded block is specifically precoded by using the first encoding QP after the residual information is quantized by using the first encoding QP.

Possibly, the precoding is spatial-domain precoding. In this case, the precoding phase may include prediction, quantization, and encoding cost calculation. Information output after prediction may include a prediction value and residual information. The reconstructed pixel may be a value obtained by performing dequantization on the quantized residual information and then performing a calculation based on dequantized residual information and the prediction value.

Possibly, the precoding is frequency domain precoding. In this case, the precoding phase may include prediction, transformation, quantization, and encoding cost calculation. Information output after prediction may include a prediction value and residual information. The reconstructed pixel may be a value obtained by performing dequantization and inverse transformation on the quantized residual information, and then performing a calculation based on residual information obtained after inverse transformation and the prediction value.

Possibly, a reconstructed pixel in frequency domain precoding may alternatively be a reconstructed pixel in spatial-domain precoding, to simplify a pixel reconstruction architecture of precoding, and reduce a calculation amount of pixel reconstruction.

In this embodiment of this application, a pixel reconstruction process in the precoding phase is specifically performed after the residual information is quantized. In this way, it can be ensured that precoding of the next coding block and real encoding of the to-be-encoded block are performed synchronously, to increase encoding efficiency.

In a possible implementation, the precoding the to-be-encoded block by using the first encoding QP includes: precoding the to-be-encoded block by using at least a reconstructed pixel of a previous coding block of the to-be-encoded block in a precoding phase as a prediction reference value and by using the first encoding QP, where the previous coding block and the to-be-encoded block are adjacent in an encoding time sequence, and an encoding time period of the previous coding block is earlier than the encoding time period of the to-be-encoded block.

In this embodiment of this application, precoding of the to-be-encoded block depends only on the reconstructed pixel of the previous coding block in the precoding phase and a reconstructed pixel of another encoded reference coding block in a real encoding phase, and does not depend on a reconstructed pixel of the previous coding block in a real encoding phase. In this way, real encoding of the previous coding block and precoding of the to-be-encoded block can be performed synchronously, to increase encoding efficiency.

In a possible implementation, the determining a first encoding QP includes: determining the first encoding QP based on the texture complexity of the to-be-encoded block and/or a fullness status of a bitstream buffer.

In this embodiment of this application, the first encoding QP may be determined preliminarily based on the texture complexity of the to-be-encoded block and/or the fullness status of the bitstream buffer, and the to-be-encoded block is precoded by using the first encoding QP to obtain a precoding result, so that the first encoding QP is adjusted based on the precoding result, to increase bit rate control precision and improve image encoding quality.

In a possible implementation, a more complex texture of the to-be-encoded block indicates a larger first encoding QP, and a simpler texture of the to-be-encoded block indicates a smaller first encoding QP. A fuller bitstream buffer indicates a larger first encoding QP, and a less full bitstream buffer indicates a smaller first encoding QP.

This embodiment of this application describes how to determine the first encoding QP based on the texture complexity of the to-be-encoded block and/or the fullness status of the bitstream buffer. The texture complexity of the to-be-encoded block is directly proportional to the first encoding QP. A more complex texture of the to-be-encoded block indicates less obvious image distortion caused by quantization and less perceptible to human eyes. Therefore, the first encoding QP may be increased to reduce a bit rate. The fullness status of the bitstream buffer is also directly proportional to the first encoding QP. When the bit rate buffer is fuller, a system expects the to-be-encoded block to require a lower bit rate. Specifically, the bit rate may be reduced by increasing the first encoding QP, to ensure that the bitstream buffer does not overflow, so as to ensure that an actual encoding bit rate is not higher than a target bit rate.

In a possible implementation, the precoding result information includes at least one of the following: a quantity of encoded bits of the to-be-encoded block obtained by using the first encoding QP, an encoding distortion magnitude of the to-be-encoded block obtained by using the first encoding QP, an encoding rate-distortion cost of the to-be-encoded block obtained by using the first encoding QP, a prediction residual of the to-be-encoded block, and the texture complexity of the to-be-encoded block.

In this embodiment of this application, the first encoding QP may be adjusted based on the precoding result information, to implement more refined bit rate control. The bit rate is properly used to transfer image data with better quality, to improve image compression performance.

In a possible implementation, the encoding result information includes the quantity of encoded bits of the to-be-encoded block obtained by using the first encoding QP. The adjusting the first encoding QP based on the precoding result information includes: decreasing the first encoding QP when the quantity of encoded bits is less than a target quantity of bits; or increasing the first encoding QP when the quantity of encoded bits is greater than the target quantity of bits, where the target quantity of bits depends on the fullness status of the bitstream buffer and a quantity of output bits of the bitstream buffer.

In this embodiment of this application, a quantity of encoded bits output after encoding may be estimated, and the first encoding QP is adjusted based on the fullness status of the bitstream buffer and the quantity of output bits of the bitstream buffer. If the estimated quantity of encoded bits output after encoding is less than a target quantity of bits of the current coding block, the first encoding QP may be decreased to increase a bit rate of the current coding block, so as to improve image compression quality. If the estimated quantity of encoded bits output after encoding is greater than the target quantity of bits of the current coding block, and the bitstream buffer is full, it indicates that the bitstream buffer may overflow. In this case, the first encoding QP may be increased to reduce the bit rate, so as to ensure that the bitstream buffer does not overflow.

Possibly, the encoding result information includes the encoding distortion magnitude of the to-be-encoded block obtained by using the first encoding QP. The adjusting the first encoding QP based on the precoding result information includes: increasing the first encoding QP when the encoding distortion is less than a first threshold; or decreasing the first encoding QP when the encoding distortion is greater than a second threshold.

Specifically, for spatial-domain encoding, the encoding distortion magnitude may be a difference between residual information obtained before quantization and residual information obtained after dequantization. For frequency domain encoding, the encoding distortion magnitude may be a difference between residual information obtained before transformation and residual information obtained after inverse transformation, or may be a difference between residual information obtained after transformation and before quantization and residual information obtained after dequantization and before inverse transformation.

In this embodiment of this application, the first encoding QP may be adjusted based on the encoding distortion magnitude. When the encoding distortion is less than a specified threshold, it indicates that the quality of an encoded image is good. In this case, the first encoding QP may be increased to reduce the quantity of encoded bits. When the encoding distortion is greater than the specified threshold, it indicates that the quality of the encoded image is poor. In this case, the first encoding QP needs to be decreased to improve image quality.

Possibly, the encoding result information includes the texture complexity of the to-be-encoded block. The adjusting the first encoding QP based on the precoding result information includes: decreasing the first encoding QP when a texture of the to-be-encoded block is simple; or increasing the first encoding QP when the texture of the to-be-encoded block is complex.

In this embodiment of this application, the first encoding QP may be adjusted based on the texture complexity of the to-be-encoded block. A simpler texture of the to-be-encoded block indicates more obvious image distortion caused by quantization and more perceptible to human eyes. The first encoding QP may be decreased to increase the bit rate, so as to ensure that the image distortion is not perceived by human eyes. A more complex texture of the to-be-encoded block indicates less obvious image distortion caused by quantization and less perceptible to human eyes. The first encoding QP may be increased to reduce the bit rate.

Possibly, the encoding result information includes the prediction residual of the to-be-encoded block. The adjusting the first encoding QP based on the precoding result information includes: decreasing the first encoding QP when an absolute value of the prediction residual is less than a third threshold; or increasing the first encoding QP when the absolute value of the prediction residual is greater than a fourth threshold.

In this embodiment of this application, the first encoding QP may be adjusted based on the prediction residual. The prediction residual may reflect the texture complexity of the to-be-encoded block. A smaller prediction residual indicates a simpler texture of the to-be-encoded block. A larger prediction residual indicates a more complex texture of the to-be-encoded block. A simpler texture of the to-be-encoded block indicates more obvious image distortion caused by quantization and more perceptible to human eyes. The first encoding QP may be decreased to reduce the distortion, to ensure that the image distortion is not perceived by human eyes. A more complex texture of the to-be-encoded block indicates less obvious image distortion caused by quantization and less perceptible to human eyes. The first encoding QP may be increased to reduce the bit rate.

According to a second aspect, an embodiment of this application provides an encoder, including: a first bit rate control module, configured to determine a first encoding quantization parameter QP; a precoding module, configured to precode the to-be-encoded block by using the first encoding QP to obtain precoding result information; a second bit rate control module, configured to adjust the first encoding QP based on the precoding result information to obtain a second encoding QP; and a real encoding module, configured to perform real encoding on the to-be-encoded block by using the second encoding QP.

In a possible implementation, the precoding module is specifically configured to: precode the to-be-encoded block by using the first encoding QP in each of a plurality of prediction modes to obtain precoding result information corresponding to the prediction mode. The encoder further includes: a selection module, configured to select an optimal prediction mode from the plurality of prediction modes. The second bit rate control module is specifically configured to:

adjust the first encoding QP based on encoding result information corresponding to the optimal prediction mode to obtain the second encoding QP. The real encoding module is specifically configured to perform real encoding on the to-be-encoded block by using the second encoding QP in the optimal prediction mode.

In a possible implementation, the encoder further includes: a pre-analysis module, configured to select at least one optimal spatial-domain prediction mode from a plurality of spatial-domain prediction modes, and select at least one optimal frequency domain prediction mode from a plurality of frequency domain prediction modes, where the at least one optimal spatial-domain prediction mode is at least one spatial-domain prediction mode with a smallest encoding cost in the plurality of spatial-domain prediction modes, the at least one optimal frequency domain prediction mode is at least one frequency domain prediction mode with a smallest encoding cost in the plurality of frequency domain prediction modes, and different prediction modes correspond to different prediction reference directions and/or different prediction value calculation methods. The precoding module is specifically configured to: perform spatial-domain precoding on the to-be-encoded block by using the first encoding QP in the at least one optimal spatial-domain prediction mode; and perform frequency domain precoding on the to-be-encoded block by using the first encoding QP in the at least one optimal frequency domain prediction mode. It should be understood that, the at least one spatial-domain prediction mode with a smallest encoding cost in the plurality of spatial-domain prediction modes may be at least one spatial-domain prediction mode that ranks high in the plurality of spatial-domain prediction modes in ascending order of encoding costs, or at least one spatial-domain prediction mode that ranks low in the plurality of spatial-domain prediction modes in descending order of encoding costs.

Specifically, according to a preset cost calculation rule, the at least one optimal spatial-domain prediction mode may be selected from the plurality of spatial-domain prediction modes, and the at least one optimal frequency domain prediction mode may be selected from the plurality of frequency domain prediction modes. The preset cost calculation rule may be any one of the following: a sum of absolute differences of residuals, an encoding bit rate, and a rate-distortion cost.

In a possible implementation, the encoder further includes a pixel reconstruction module, configured to: when the precoding module precodes the to-be-encoded block by using the first encoding QP, perform pixel reconstruction on the to-be-encoded block to obtain a reconstructed pixel of the to-be-encoded block in a precoding phase. The precoding module is further configured to precode a next coding block of the to-be-encoded block with reference to the reconstructed pixel of the to-be-encoded block in the precoding phase.

Specifically, the next coding block and the to-be-encoded block are adjacent in an encoding time sequence, and an encoding time period of the to-be-encoded block is earlier than an encoding time period of the next coding block.

In a possible implementation, the precoding module includes: a prediction unit, configured to predict the to-be-encoded block to obtain residual information; a quantization unit, configured to quantize the residual information by using the first encoding QP; and a cost calculation unit, configured to calculate an encoding cost based on quantized residual information. The to-be-encoded block is specifically precoded by using the first encoding QP after the residual information is quantized by using the first encoding QP.

Possibly, the precoding is spatial-domain precoding. In this case, the precoding phase may include prediction, quantization, and encoding cost calculation. Information output after prediction may include a prediction value and residual information. The reconstructed pixel may be a value obtained by performing dequantization on the quantized residual information, and then performing a calculation based on residual information obtained after dequantization and the prediction value.

Possibly, the precoding is frequency domain precoding. In this case, the precoding phase may include prediction, transformation, quantization, and encoding cost calculation. Information output after prediction may include a prediction value and residual information. The reconstructed pixel may be a value obtained by performing dequantization and inverse transformation on the quantized residual information, and then performing a calculation based on residual information obtained after inverse transformation and the prediction value.

Possibly, a reconstructed pixel in frequency domain precoding may alternatively be a reconstructed pixel in spatial-domain precoding, to simplify a pixel reconstruction architecture of precoding, and reduce a calculation amount of pixel reconstruction.

In a possible implementation, the precoding module is specifically configured to precode the to-be-encoded block by using at least a reconstructed pixel of a previous coding block of the to-be-encoded block in a precoding phase as a prediction reference value and by using the first encoding QP, where the previous coding block and the to-be-encoded block are adjacent in an encoding time sequence, and an encoding time period of the previous coding block is earlier than an encoding time period of the to-be-encoded block.

In a possible implementation, the first bit rate control module is specifically configured to determine the first encoding QP based on texture complexity of the to-be-encoded block and/or a fullness status of a bitstream buffer.

In a possible implementation, a more complex texture of the to-be-encoded block indicates a larger first encoding QP, and a simpler texture of the to-be-encoded block indicates a smaller first encoding QP. A fuller bitstream buffer indicates a larger first encoding QP, and a less full bitstream buffer indicates a smaller first encoding QP.

In a possible implementation, the precoding result information includes at least one of the following: a quantity of encoded bits of the to-be-encoded block obtained by using the first encoding QP, an encoding distortion magnitude of the to-be-encoded block obtained by using the first encoding QP, an encoding rate-distortion cost of the to-be-encoded block obtained by using the first encoding QP, a prediction residual of the to-be-encoded block, and the texture complexity of the to-be-encoded block.

In a possible implementation, the encoding result information includes the quantity of encoded bits of the to-be-encoded block obtained by using the first encoding QP. The second bit rate control module is specifically configured to: decrease the first encoding QP when the quantity of encoded bits is less than a target quantity of bits; or increase the first encoding QP when the quantity of encoded bits is greater than the target quantity of bits, where the target quantity of bits depends on the fullness status of the bitstream buffer and a quantity of output bits of the bitstream buffer.

Possibly, the encoding result information includes the encoding distortion magnitude of the to-be-encoded block obtained by using the first encoding QP. The adjusting the first encoding QP based on the precoding result information includes: increasing the first encoding QP when the encoding distortion is less than a first threshold; and decreasing the first encoding QP when the encoding distortion is greater than a second threshold.

Specifically, for spatial-domain encoding, the encoding distortion magnitude may be a difference between residual information obtained before quantization and residual information obtained after dequantization. For frequency domain encoding, the encoding distortion magnitude may be a difference between residual information obtained before transformation and residual information obtained after inverse transformation, or may be a difference between residual information obtained after transformation and before quantization and residual information obtained after dequantization and before inverse transformation.

Possibly, the encoding result information includes the texture complexity of the to-be-encoded block. The adjusting the first encoding QP based on the precoding result information includes: decreasing the first encoding QP when a texture of the to-be-encoded block is simple; or increasing the first encoding QP when the texture of the to-be-encoded block is complex.

Possibly, the encoding result information includes the prediction residual of the to-be-encoded block. The adjusting the first encoding QP based on the precoding result information includes: decreasing the first encoding QP when an absolute value of the prediction residual is less than a third threshold; or increasing the first encoding QP when the absolute value of the prediction residual is greater than a fourth threshold.

According to a third aspect, an embodiment of this application provides an encoder, including a memory and a processor. The memory is coupled to the processor, and the memory is configured to store software instructions. The processor is configured to invoke the software instructions, to enable the processor to perform the encoding method provided in the first aspect or any possible implementation of the first aspect of the embodiments of this application.

According to a fourth aspect, an embodiment of this application provides a computer-readable storage medium. The computer-readable storage medium stores instructions. When the instructions are run on a computer or a processor, the computer or the processor is enabled to perform the encoding method provided in the first aspect or any possible implementation of the first aspect of the embodiments of this application.

According to a fifth aspect, an embodiment of this application provides a computer program product including instructions. When the computer program product runs on a computer or a processor, the computer or the processor is enabled to perform the encoding method provided in the first aspect or any possible implementation of the first aspect of the embodiments of this application.

It may be understood that the encoder provided in the second aspect, the encoder provided in the third aspect, the computer storage medium provided in the fourth aspect, and the computer program product provided in the fifth aspect are all configured to perform the encoding method provided in the first aspect. Therefore, for beneficial effects that can be achieved by the encoder provided in the second aspect, the encoder provided in the third aspect, the computer storage medium provided in the fourth aspect, and the computer program product provided in the fifth aspect, refer to beneficial effects in the encoding method provided in the first aspect. Details are not described herein again.

BRIEF DESCRIPTION OF DRAWINGS

To describe technical solutions of embodiments of this application more clearly, the following briefly describes accompanying drawings used for describing the embodiments.

DESCRIPTION OF EMBODIMENTS

Figure 1:
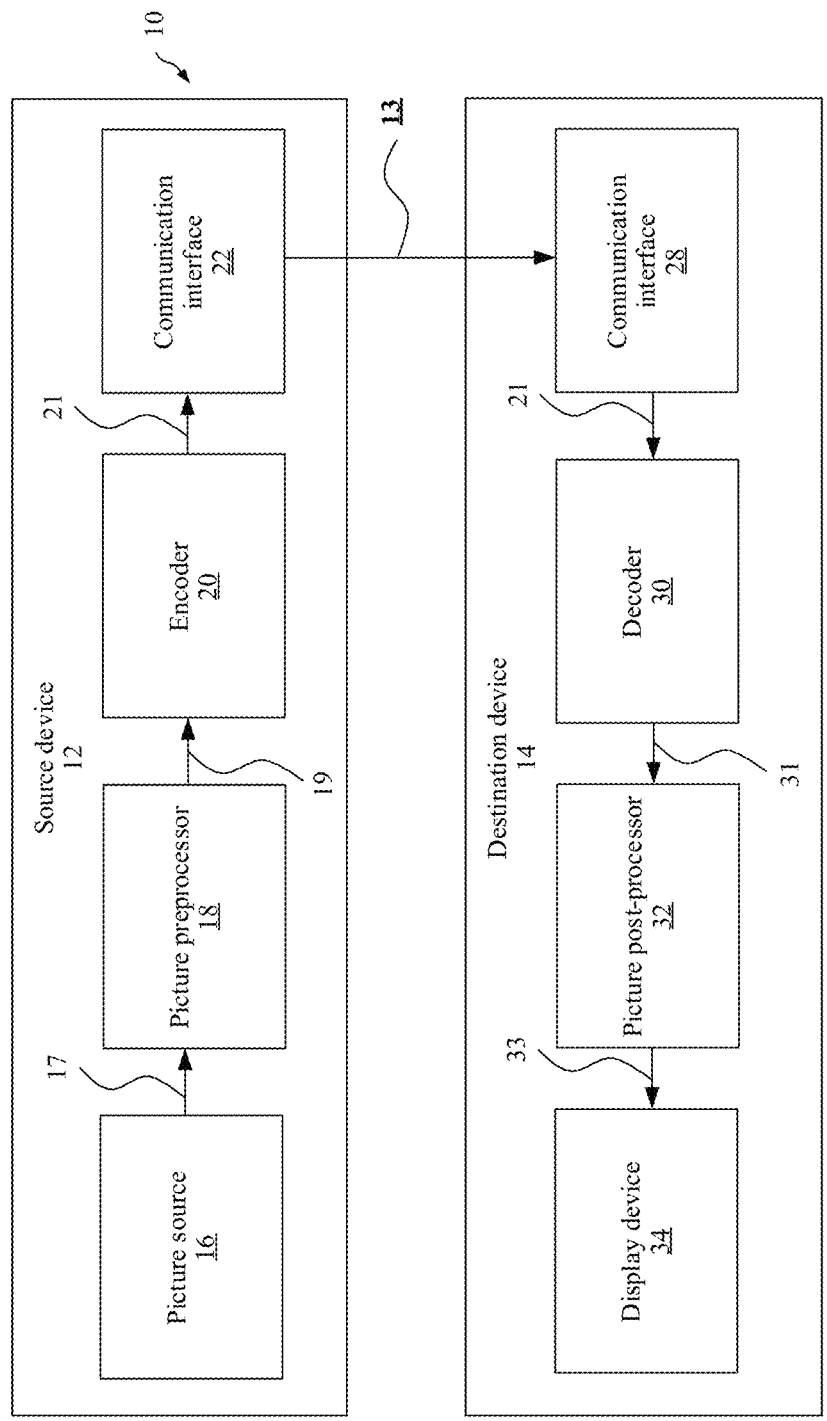
FIG. 1 is a block diagram of a video encoding and decoding system to which this application is applicable.

The following clearly describes technical solutions in embodiments of this application with reference to accompanying drawings in the embodiments of this application.

The technical solutions in the embodiments of this application are not only applicable to existing video coding standards (for example, standards such as H.264 and HEVC), but also applicable to future video coding standards (for example, the H.266 standard). Terms used in implementations of this application are only used to explain specific embodiments of this application, but are not intended to limit this application. The following first briefly describes related concepts in the embodiments of this application.

Video coding usually refers to processing of a sequence of pictures, where the sequence of pictures forms a video or a video sequence. In the field of video coding, the terms "picture", "frame", or "image" may be used as synonyms. Video encoding is performed on a source side, and usually includes processing (for example, through compression) original video pictures to reduce an amount of data for representing the video pictures for more efficient storage and/or transmission. Video decoding is performed on a destination side, and usually includes inverse processing relative to an encoder, to reconstruct video pictures.

A video sequence includes a series of images (pictures), an image is further split into slices, and a slice is further split into blocks. In video coding, coding processing is performed per block. In some new video coding standards, the concept of a "block" is further extended. For example, in the H.264 standard, there is a macroblock (MB), and the macroblock may be further split into a plurality of prediction blocks (partition) that can be used for predictive coding. In the high efficiency video coding (HEVC) standard, basic concepts such as a coding unit (CU), a prediction unit (PU), and a transform unit (TU) are used.

In this specification, for ease of description and understanding, a coding block to be processed in a current image may be referred to as a current coding block or a to-be-processed coding block. For example, in encoding, the coding block is a block that is being encoded, and in decoding, the coding block is a block that is being decoded. A decoded coding block that is in a reference image and that is for predicting the current block is referred to as a reference block. In other words, the reference block is a block that provides a reference signal for the current block, where the reference signal indicates a pixel value in the coding block. A block that provides a prediction signal for a current block in a reference image may be referred to as a prediction block. The prediction signal indicates a pixel value, a sampling value, or a sampling signal in the prediction block. For example, an optimal reference block is found after a plurality of reference blocks are traversed, the optimal reference block provides prediction for the current block, and this block is referred to as a prediction block.

In a case of lossless video coding, original video pictures can be reconstructed. In other words, reconstructed video pictures have the same quality as the original video pictures (assuming that no transmission loss or other data loss occurs during storage or transmission). In a case of lossy video coding, further compression is performed through, for example, quantization, to reduce an amount of data required for representing video pictures, and the video pictures cannot be completely reconstructed on a decoder side. In other words, the quality of the reconstructed video pictures is lower or poorer than that of the original video pictures.

The following describes a system architecture used in the embodiments of this application. FIG. 1 is a schematic block diagram of an example of a video encoding and decoding system 10 according to an embodiment of this application. As shown in FIG. 1, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. The source device 12, the destination device 14, or various implementation solutions of the source device 12 or the destination device 14 may include one or more processors and a memory coupled to the one or more processors. The memory may include but is not limited to a random access memory (RAM), a read-only memory (ROM), an electrically erasable programmable read-only memory (EEPROM), a flash memory, or any other medium that can be used to store desired program code in a form of an instruction or a data structure that can be accessed by a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, an in-vehicle computer, a wireless communication device, or the like.

Although FIG. 1 depicts the source device 12 and the destination device 14 as separate devices, a device embodiment may alternatively include both the source device 12 and the destination device 14 or functionality of both the source device 12 and the destination device 14, that is, the source device 12 or corresponding functionality, and the destination device 14 or corresponding functionality. In such embodiments, the source device 12 or the corresponding functionality and the destination device 14 or the corresponding functionality may be implemented by using the same hardware and/or software, separate hardware and/or software, or any combination thereof.

A communication connection between the source device 12 and the destination device 14 may be implemented through a link 13, and the destination device 14 may receive the encoded video data from the source device 12 through the link 13. The link 13 may include one or more media or apparatuses capable of moving the encoded video data from the source device 12 to the destination device 14. In an example, the link 13 may include one or more communication media that enable the source device 12 to transmit the encoded video data directly to the destination device 14 in real time.

In this example, the source device 12 may modulate the encoded video data according to a communication standard (for example, a wireless communication protocol), and may transmit modulated video data to the destination device 14. The one or more communication media may include a wireless and/or wired communication medium, for example, a radio frequency (RF) spectrum or one or more physical transmission lines. The one or more communication media may constitute a part of a packet-based network, and the packet-based network is, for example, a local area network, a wide area network, or a global network (for example, the internet). The one or more communication media may include a router, a switch, a base station, or another device that facilitates communication from the source device 12 to the destination device 14.

The source device 12 includes an encoder 20, and optionally, the source device 12 may further include a picture source 16, a picture preprocessor 18, and a communication interface 22. In a specific implementation form, the encoder 20, the picture source 16, the picture preprocessor 18, and the communication interface 22 may be hardware components in the source device 12, or may be software programs in the source device 12. Descriptions are separately provided as follows.

The picture source 16 may include or be any type of picture capture device configured to, for example, capture a real-world picture; and/or any type of device for generating a picture or comment (for screen content encoding, some text on a screen is also considered as a part of a to-be-encoded picture or image), for example, a computer graphics processing unit configured to generate a computer animation picture; or any type of device for obtaining and/or providing a real-world picture or a computer animation picture (for example, screen content or a virtual reality (VR) picture); and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera, or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processing unit, a computer, or a server. The interface may be any type of interface, for example, a wired or wireless interface or an optical interface, according to any proprietary or standardized interface protocol.

A picture may be considered as a two-dimensional array or matrix of pixels (picture element). In this embodiment of this application, a picture transmitted by the picture source 16 to a picture processor may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion, color correction, or denoising.

The encoder 20 (or referred to as a video encoder 20) is configured to receive the preprocessed picture data 19, and process the preprocessed picture data 19 in a related prediction mode (for example, a prediction mode in the embodiments of this specification), to provide encoded picture data 21 (details of a structure of the encoder 20 are further described below based on FIG. 3). In some embodiments, the encoder 20 may be configured to perform the embodiments described below, to implement an encoding method described in this application.

The communication interface 22 may be configured to receive the encoded picture data 21, and transmit the encoded picture data 21 to the destination device 14 or any other device (for example, a memory) through the link 13 for storage or direct reconstruction. The other device may be any device configured for decoding or storage. The communication interface 22 may be, for example, configured to encapsulate the encoded picture data 21 into an appropriate format, for example, a data packet, for transmission over the link 13.

The destination device 14 includes a decoder 30. Optionally, the destination device 14 may further include a communication interface 28, a picture post-processor 32, and a display device 34. Descriptions are separately provided as follows.

The communication interface 28 may be configured to receive the encoded picture data 21 from the source device 12 or any other source. The other source is, for example, a storage device. The storage device is, for example, an encoded picture data storage device. The communication interface 28 may be configured to transmit or receive the encoded picture data 21 through the link 13 between the source device 12 and the destination device 14 or through any type of network. The link 13 is, for example, a direct wired or wireless connection. The network is, for example, a wired or wireless network or any combination thereof, or any type of private or public network, or any combination thereof. The communication interface 28 may be, for example, configured to decapsulate the data packet transmitted through the communication interface 22, to obtain the encoded picture data 21.

Both the communication interface 28 and the communication interface 22 may be configured as unidirectional communication interfaces or bidirectional communication interfaces, and may be configured to, for example, send and receive messages to establish a connection, and acknowledge and exchange any other information related to a communication link and/or data transmission such as encoded picture data transmission.

The decoder 30 is configured to: receive the encoded picture data 21, and provide a decoded picture data 31.

The picture post-processor 32 is configured to perform post-processing on the decoded picture data 31 (also referred to as reconstructed picture data) to obtain post-processed picture data 33. The post-processing performed by the picture post-processor 32 may include color format conversion (for example, convert a YUV format into an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture, for example, to a user or a viewer. The display device 34 may be or include any type of display configured to present a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCOS), a digital light processor (DLP), or any type of other display.

Although FIG. 1 depicts the source device 12 and the destination device 14 as separate devices, a device embodiment may alternatively include both the source device 12 and the destination device 14 or functionality of both the source device 12 and the destination device 14, that is, the source device 12 or corresponding functionality, and the destination device 14 or corresponding functionality. In such embodiments, the source device 12 or the corresponding functionality and the destination device 14 or the corresponding functionality may be implemented by using the same hardware and/or software, separate hardware and/or software, or any combination thereof.

As will be apparent for a person skilled in the art based on the descriptions, existence and (exact) split of functionality of the different units or functionality of the source device 12 and/or the destination device 14 shown in FIG. 1 may vary depending on an actual device and application. The source device 12 and the destination device 14 each may include any one of a wide range of devices, including any type of handheld or stationary device, for example, a notebook or laptop computer, a mobile phone, a smartphone, a pad or a tablet computer, a video camera, a desktop computer, a set-top box, a television, a camera, a vehicle-mounted device, a display device, a digital media player, a video game console, a video streaming transmission device (such as a content service server or a content distribution server), a broadcast receiver device, and a broadcast transmitter device, and may not use or may use any type of operating system.

The encoder 20 and the decoder 30 each may be implemented as any one of various appropriate circuits, for example, one or more microprocessors, digital signal processors (DSP), application-specific integrated circuits (ASIC), field-programmable gate arrays (FPGA), discrete logic, hardware, or any combinations thereof. If the technologies are implemented partially by using software, a device may store software instructions in an appropriate and non-transitory computer-readable storage medium and may execute the instructions by using hardware such as one or more processors, to perform the technologies of this disclosure. Any one of the foregoing content (including hardware, software, a combination of hardware and software, and the like) may be considered as one or more processors.

In some cases, the video encoding and decoding system 10 shown in FIG. 1 is merely an example, and the technologies of this application are applicable to video coding settings (for example, video encoding or video decoding) that do not necessarily include any data communication between an encoding device and a decoding device. In other examples, data may be retrieved from a local memory, streamed over a network, or the like. The video encoding device may encode data and store the data into a memory, and/or the video decoding device may retrieve data from a memory and decode the data. In some examples, encoding and decoding are performed by devices that do not communicate with each other but simply encode data to the memory and/or retrieve the data from the memory and decode the data.

Figure 2:
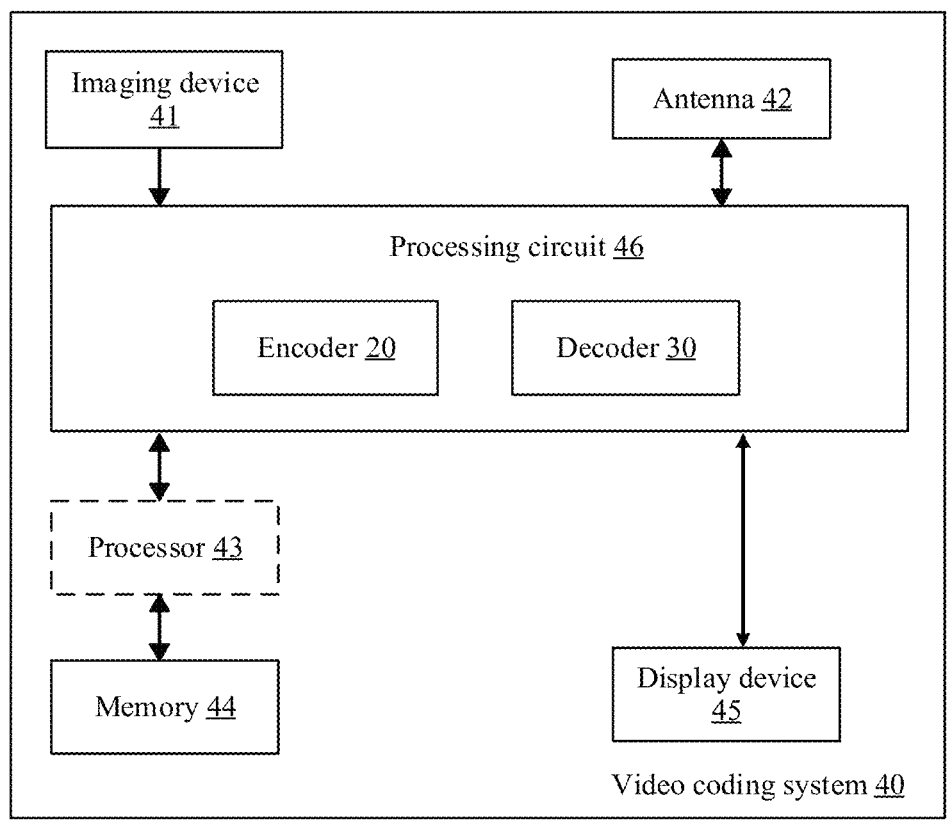
FIG. 2 is a block diagram of a video coding system to which this application is applicable.

FIG. 2 is an illustrative diagram of an example of a video coding system 40 including an encoder and/or a decoder according to an exemplary embodiment. The video coding system 40 can implement a combination of various technologies in the embodiments of this application. In an illustrated implementation, the video coding system 40 may include an imaging device 41, the encoder 20, the decoder 30 (and/or a video encoder/decoder implemented by a processing circuit 46), an antenna 42, one or more processors 43, one or more memories 44, and/or a display device 45.

As shown in FIG. 2, the imaging device 41, the antenna 42, the processing circuit 46, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. Further, in some examples, the display device 45 may be configured to present the video data. The processing circuit 46 may include application-specific integrated circuit (ASIC) logic, a graphics processing unit, a general-purpose processor, or the like. The video coding system 40 may also include the optional processor 43. The optional processor 43 may similarly include application-specific integrated circuit (ASIC) logic, a graphics processor, a general-purpose processor, or the like. In some examples, the processor 43 may be implemented by using general-purpose software, an operating system, or the like. In addition, the memory 44 may be any type of memory, for example, a volatile memory (for example, a static random access memory (SRAM) or a dynamic random access memory (DRAM)), or a nonvolatile memory (for example, a flash memory). In a non-limiting example, the memory 44 may be implemented by a cache.

In some examples, the antenna 42 may be configured to receive the encoded bitstream of the video data. As described, the encoded bitstream may include data, an indicator, an index value, mode selection data, or the like related to video frame encoding described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment of this application, for the example described with reference to the encoder 20, the decoder 30 may be configured to perform an inverse process. With regard to signaling a syntax element, the decoder 30 may be configured to receive and parse such a syntax element and correspondingly decode related video data. In some examples, the encoder 20 may entropy encode the syntax element into an encoded video bitstream. In such examples, the decoder 30 may parse such a syntax element and correspondingly decode related video data.

It should be noted that a video image encoding method described in the embodiments of this application is performed by the encoder 20 and a video image decoding method described in the embodiments of this application is performed by the decoder 30. The encoder 20 and the decoder 30 in the embodiments of this application may be, for example, an encoder/a decoder corresponding to a video standard protocol such as H.263, H.264, HEVV, MPEG-2, MPEG-4, VP8, or VP9, or a next-generation video standard protocol (for example, H.266).

Figure 3:
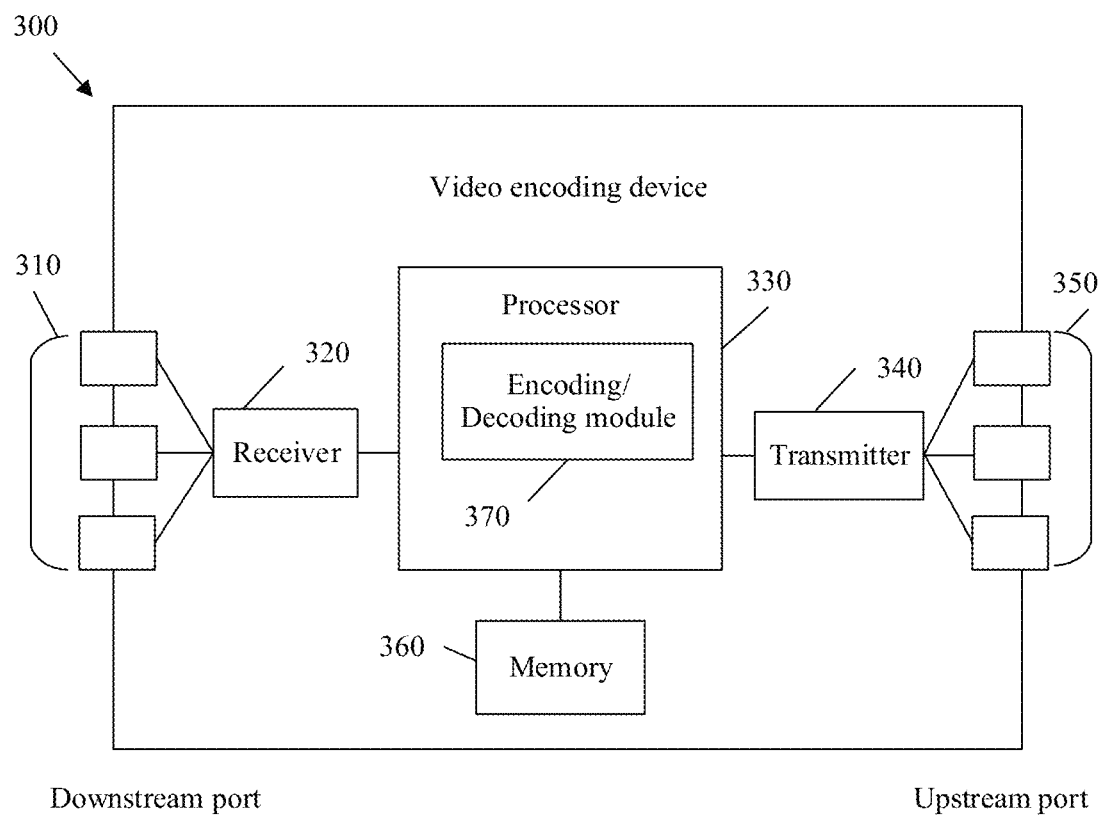
FIG. 3 is a schematic diagram of a structure of a video coding device according to an embodiment of this application.

FIG. 3 is a schematic diagram of a structure of a video coding device 300 (for example, a video encoding device 300 or a video decoding device 300) according to an embodiment of this application. The video coding device 300 is applicable to implementing an embodiment described in this specification. In an embodiment, the video coding device 300 may be a video decoder (for example, the decoder 30 in FIG. 1) or a video encoder (for example, the encoder 20 in FIG. 1). In another embodiment, the video coding device 300 may be one or more components of the decoder 30 in FIG. 1 or of the encoder 20 in FIG. 1.

The video coding device 300 includes: an ingress port 310 and a receiver unit 320 for receiving data; a processor, a logic unit, or a central processing unit 330 for processing data; a transmitter unit 340 (or briefly referred to as a transmitter 340) and an egress port 350 for transmitting data; and a memory 360 for storing data. The video coding device 300 may further include an optical-to-electrical conversion component and an electrical-to-optical component that are coupled to the ingress port 310, the receiver unit 320 (or briefly referred to as a receiver 320), the transmitter unit 340, and the egress port 350 for egress or ingress of optical or electrical signals.

The processor 330 is implemented by hardware and software. The processor 330 may be implemented as one or more CPU chips, cores (for example, a multi-core processor), FPGAs, ASICs, and DSPs. The processor 330 communicates with the ingress ports 310, the receiver units 320, the transmitter units 340, the egress ports 350, and the memory 360. The processor 330 includes a decoding module 370 (for example, an encoding module 370). The encoding module 370 implements the embodiments disclosed in this specification, to implement the encoding method provided in the embodiments of this application. For example, the encoding module 370 implements, processes, or provides various coding operations. Therefore, the encoding module 370 substantially improves functions of the video coding device 300 and affects transform of the video coding device 300 to a different state. Alternatively, the encoding module 370 is implemented as instructions stored in the memory 360 and executed by the processor 330.

The memory 360 includes one or more disks, tape drives, and solid state drives and may be used as an overflow data storage device, to store programs when such programs are selected for execution, and to store instructions and data that are read during program execution. The memory 360 may be volatile and/or non-volatile, and may be a read-only memory, a random access memory, a ternary content-addressable memory (TCAM), and/or a static random access memory.

The following describes two prediction modes in this embodiment of this application: block-level prediction and point-level prediction.

Block-level prediction: A coding block is used as a prediction unit, and a pixel in a current coding block cannot be used as a reference pixel for a subsequent pixel in the current coding block.

Point-level prediction: A point is used as a prediction unit, and a pixel in a current coding block may be used as a reference pixel for a subsequent pixel in the current coding block.

A pixel value of the reference pixel mentioned in the block-level prediction or point-level prediction may be used as a reference value of a pixel in the current coding block, to calculate a prediction value of the pixel in the current coding block. The pixel value of the reference pixel may be a reconstructed value of the reference pixel.

Figure 4:
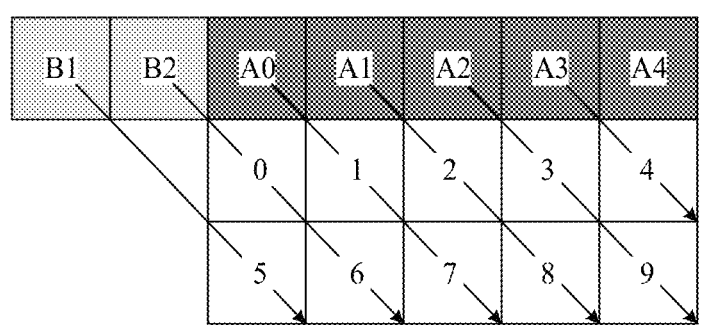
FIG. 4 is a schematic diagram of a block-level prediction mode according to an embodiment of this application.
Figure 5:
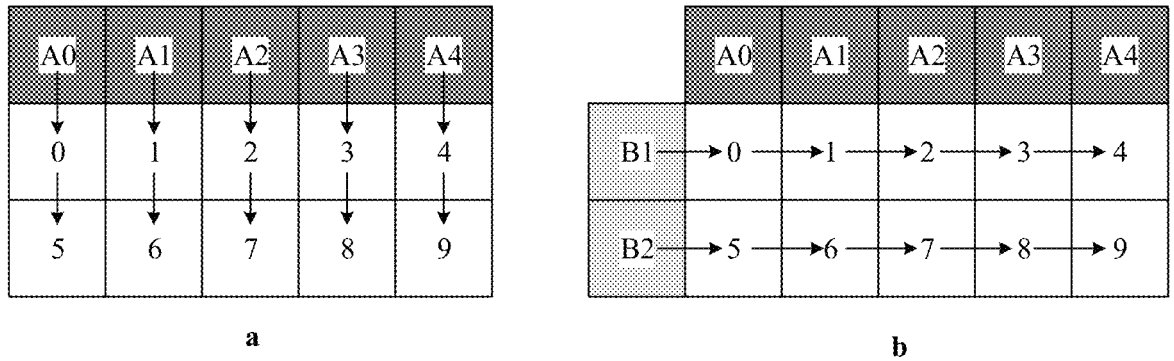
FIG. 5 is a schematic diagram of several prediction modes according to an embodiment of this application.

The following further explains the block-level prediction with reference to the schematic diagram of the block-level prediction mode provided in FIG. 4, and further explains the point-level prediction with reference to schematic diagrams of several prediction modes provided in FIG. 5.

First, it is assumed that the to-be-encoded image is divided, by block, into several coding blocks of equal size, and each coding block includes 10 pixels. In FIG. 4 and FIGS. 5, A0, A1, A2, A3, and A4 are five pixels (other five pixels are not shown) included in the coding block A, B1 and B2 are two pixels included in the coding block B (other eight pixels are not shown), and 0, 1, 2, 3, 4, 5, 6, 7, 8, and 9 are 10 pixels included in the current coding block. Arrows in the figures indicate prediction directions. To be specific, a start point of an arrow is a prediction reference pixel, and a pixel that the arrow passes through and an end point of the arrow are to-be-predicted pixels. A direction of an arrow in the figures may indicate a prediction reference direction of the prediction mode.

As shown in FIG. 4, the pixel B1 is a reference pixel of the pixel 5, the pixel B2 is a reference pixel of the pixel 0 and the pixel 6, the pixel A0 is a reference pixel of the pixel 1 and the pixel 7, the pixel A1 is a reference pixel of the pixel 2 and the pixel 8, the pixel A2 is a reference pixel of the pixel 3 and the pixel 9, the pixel A3 is a reference pixel of the pixel 4, and the like. It can be learned that a pixel in a current coding block may not be used as a reference pixel for a subsequent pixel in the current coding block. For example, the pixel 0 cannot be used as a reference pixel of the pixel 6, and the pixel 1 cannot be used as a reference pixel of the pixel 7. This is block-level prediction.

As shown in a in FIG. 5, the pixel 0 is a reference pixel of the pixel 5, the pixel 1 is a reference pixel of the pixel 6, the pixel 2 is a reference pixel of the pixel 7, the pixel 3 is a reference pixel of the pixel 8, and the pixel 4 is a reference pixel of the pixel 9. It can be learned that a pixel in a current coding block may be used as a reference pixel for a subsequent pixel in the current coding block. This is point-level prediction.

As shown in b in FIG. 5, the pixel 0 is a reference pixel of the pixel 1, the pixel 1 is a reference pixel of the pixel 2, the pixel 7 is a reference pixel of the pixel 8, and the like. It can be learned that a pixel in a current coding block may be used as a reference pixel for a subsequent pixel in the current coding block. This is point-level prediction.

It can be learned from the directions of arrows that, the two types of point-level predictions in a and b in FIG. 5 have different prediction reference directions. A prediction reference direction of a in FIG. 5 is a vertical direction, and a prediction direction of b in FIG. 5 is a horizontal direction. A prediction direction of the block-level prediction in FIG. 4 is a lower-right diagonal direction.

Certainly, the prediction modes are not limited to the several prediction modes shown in FIG. 4 or FIG. 5. In a specific implementation, other prediction modes may also be used, and different prediction modes have different prediction reference directions and/or different prediction value calculation methods. The prediction value calculation method is how to calculate a prediction value of a current coding pixel based on a value of a reference pixel. For example, the value of the reference pixel may be directly used as the prediction value of the current coding pixel, or an average value of the reference pixel and values of other pixels around the reference pixel may be used as the prediction value of the current coding pixel. A specific prediction reference direction of a prediction mode and a prediction value calculation method are not limited in this embodiment of this application.

Figure 6:
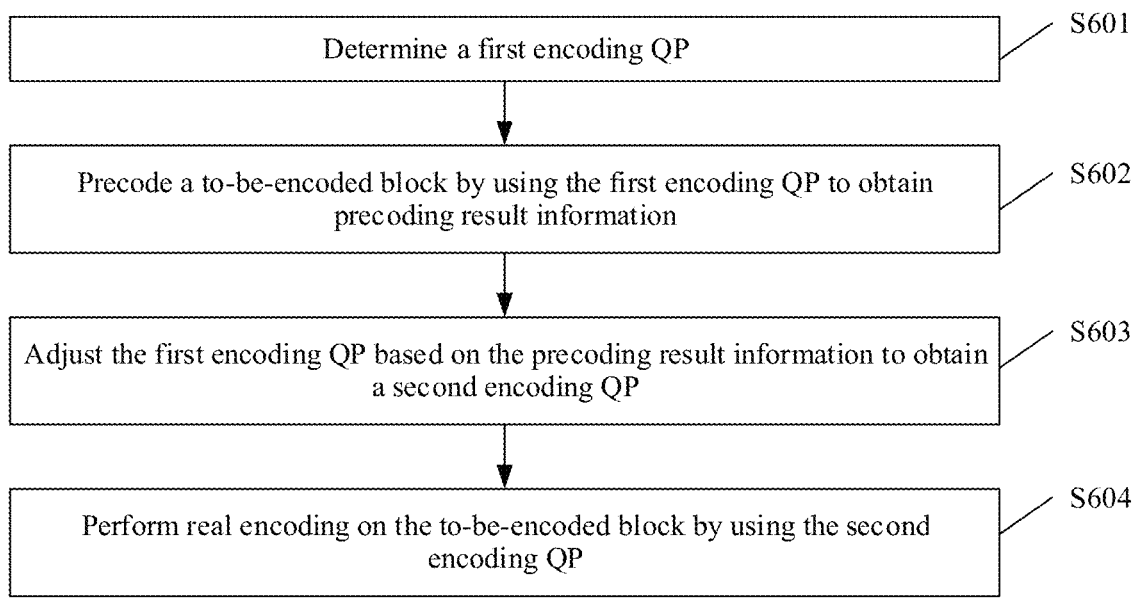
FIG. 6 is a schematic flowchart of an encoding method according to an embodiment of this application.

The following describes an encoding method provided in embodiments of this application with reference to FIG. 6. FIG. 6 is a schematic flowchart of an encoding method according to an embodiment of this application. As shown in FIG. 6, the encoding method may include at least the following steps.

S601: Determine a first encoding QP.

Specifically, the first encoding QP may be determined based on texture complexity of a to-be-encoded block and/or a fullness status of a bitstream buffer.

Specifically, the first encoding QP may be directly proportional to the texture complexity of the to-be-encoded block. A more complex texture of the to-be-encoded block indicates a larger first encoding QP. A simpler texture of the to-be-encoded block indicates a smaller first encoding QP.

It can be learned that, a higher texture complexity of the to-be-encoded block indicates less obvious image distortion caused by quantization and less perceptible to human eyes. A larger first encoding QP may be used to reduce a bit rate that may be occupied after the to-be-encoded block is encoded. A simpler texture of the to-be-encoded block indicates more obvious image distortion caused by quantization and more perceptible to human eyes. The first encoding QP may be decreased to reduce the distortion, to ensure that the image distortion is not perceived by human eyes.

Specifically, the first encoding QP may be directly proportional to the fullness status of the bitstream buffer. A fuller bitstream buffer indicates a larger first encoding QP. A less full bitstream buffer indicates a smaller first encoding QP.

It can be learned that, for a fuller bitstream buffer, a bit rate that may be occupied by the to-be-encoded block needs to be reduced to prevent bitstream buffer overflow. This may be specifically implemented by using a larger first encoding QP. A less full bitstream buffer indicates a surplus in a current bit rate. The bit rate that may be occupied by the to-be-encoded block may be increased to increase image information carried after the to-be-encoded block is encoded, so that a decoded image is restored to a higher degree. This may be specifically implemented by using a smaller first encoding QP.

In a specific implementation, the texture complexity may be quantized, and first encoding QPs corresponding to different degrees of texture complexity may be set. The fullness status of the bitstream buffer may also be quantized, and first encoding QPs corresponding to different fullness statuses may be set.

If the first encoding QP can be determined based on both the texture complexity of the to-be-encoded block and the fullness status of the bitstream buffer, the first encoding QPs corresponding to the texture complexity and the fullness statuses may be combined to obtain a final first encoding QP. Specifically, the first encoding QPs corresponding to the texture complexity and the fullness statuses may be averaged or weighted summed to obtain the final first encoding QP. Each of the weights of the texture complexity and of the fullness statuses may be a default weight obtained based on a priori information.

Possibly, based on statistical information of a currently encoded coding block, texture complexity of the coding block and a correspondence between the first encoding QP and an encoding bit rate may be obtained. For the to-be-encoded block, the first encoding QP may be determined by searching for the correspondence based on the texture complexity of the to-be-encoded block and the encoding bit rate. The encoding bit rate of the to-be-encoded block may be determined based on a current fullness status of the bitstream buffer.

The foregoing manner for determining the first encoding QP is merely an example for description. In a specific implementation, another determining manner may be used. This is not limited in this embodiment of this application.

S602: Precode the to-be-encoded block by using the first encoding QP to obtain precoding result information.

Specifically, the precoding may be an estimation an encoding result of the to-be-encoded block based on a priori information (or historical statistical information). The a priori information or the historical statistics information may be information about the currently encoded coding block. Alternatively, the precoding may be encoding the to-be-encoded block in advance, to obtain an encoding result of the to-be-encoded block.

The precoding may include spatial-domain precoding and frequency domain precoding. The spatial-domain precoding may include prediction, quantization, and cost calculation. The frequency domain precoding may include prediction, transformation, quantization, and cost calculation. The prediction may be a determinion of a prediction value and a prediction residual of the to-be-encoded block based on a prediction reference direction and a prediction value calculation method that correspond to a prediction mode.

The transformation may be performing frequency domain transformation on the prediction residual, to obtain a transform coefficient in a transform domain.

Quantization in the spatial-domain precoding may be quantizing the prediction residual by using the first encoding QP. Quantization in the frequency domain precoding may be quantizing the transform coefficient by using the first encoding QP.

Cost calculation in the spatial-domain precoding may be calculating an encoding cost corresponding to quantization of the prediction residual. Cost calculation in the frequency domain precoding may be calculating an encoding cost corresponding to quantization of the transform coefficient.

A manner for calculating a cost in a precoding phase may include any one of the following: an encoding bit rate (R), an encoding rate-distortion cost (RDCOST), an encoding distortion magnitude, and the like. The encoding distortion magnitude may be measured by using measures such as a sum of absolute differences (SAD), a mean absolute difference (MAD), a sum of squared differences (SSD), a sum of squared errors (SSE), and a mean squared error (MSE). Specifically, the precoding result information may include at least one of the following: a quantity of encoded bits of the to-be-encoded block obtained by using the first encoding QP, an encoding distortion magnitude of the to-be-encoded block obtained by using the first encoding QP, an RDCOST of the to-be-encoded block obtained by using the first encoding QP, the prediction residual of the to-be-encoded block, and the texture complexity of the to-be-encoded block.

For the spatial-domain precoding, the encoding distortion magnitude may be a difference between residual information obtained before quantization and residual information obtained after dequantization. For the frequency domain precoding, the encoding distortion magnitude may be a difference between residual information obtained before transformation and residual information obtained after inverse transformation, or may be a difference between residual information obtained after transformation and before quantization and residual information obtained after dequantization and before inverse transformation.

It can be learned that the to-be-encoded block may include a plurality of pixels, and each pixel corresponds to a difference of one piece of residual information (before quantization and after dequantization, or before transformation and after inverse transformation). In other words, the to-be-encoded block may include a plurality of differences of the residual information. The encoding distortion magnitude may be a final value obtained by calculating the plurality of differences as one value according to a calculation rule (for example, an SAD, an MAD, an SSE, an SSD, or an MSE).

Rate-distortion cost estimation is to select a proper encoding method, to ensure less distortion with a small bit rate. The rate-distortion cost may be used to measure an image encoding result by combining the encoding bit rate and the distortion magnitude. A smaller rate-distortion cost indicates better image encoding performance. RDCOST=D+λ*R, where D is a distortion magnitude, R is a bit rate, λ is a Lagrangian optimization factor, and a value of λ may be positively correlated with the first encoding QP and a fullness degree of the bitstream buffer.

S603: Adjust the first encoding QP based on the precoding result information to obtain a second encoding QP.

Possibly, the encoding result information includes the quantity of encoded bits of the to-be-encoded block obtained by using the first encoding QP. When the quantity of encoded bits is less than a target quantity of bits, the first encoding QP is decreased. When the quantity of encoded bits is greater than the target quantity of bits, the first encoding QP is increased.

The target quantity of bits of the to-be-encoded block is determined based on the fullness status of the bitstream buffer and a quantity of output bits of the bitstream buffer. A fuller bitstream buffer indicates a larger decrease in the target quantity of bits of the to-be-encoded block based on the quantity of output bits of the bitstream buffer. A less full bitstream buffer indicates a larger increase in the target quantity of bits of the to-be-encoded block based on the quantity of output bits of the bitstream buffer.

It can be learned that the quantity of output bits of the bitstream buffer may be determined based on a current target bit rate of an encoder. For example, if the current target bit rate of the encoder is 1 megabit per second (Mbps), and a current frame rate is 30 frames per second, each frame of image is divided into 30 coding blocks. If a bit rate is evenly distributed to each coding block, a current quantity of output bits of the bitstream buffer may be 1 megabit/(30*30). The manner in which the quantity of output bits of the bitstream buffer is calculated based on the target bit rate of the encoder is merely an example for description. In a specific implementation, there may be another calculation manner (for example, a bit rate is not evenly distributed to each coding block). This is not limited in this embodiment of this application.

For example, the quantity of output bits of the bitstream buffer is 100 bits. When the fullness status of the bitstream buffer is 50%, the target quantity of bits is equal to the quantity of output bits. When a current fullness status of the bitstream buffer is 60%, the target quantity of bits is 90 bits. When the current fullness status of the bitstream buffer is 80%, the target quantity of bits is 70 bits. When the current fullness status of the bitstream buffer is 30%, the target quantity of bits is 120 bits. The fullness status of the bitstream buffer is indicated by a percentage. The percentage is a ratio of a currently used capacity to a total capacity of the bitstream buffer.

A correspondence between the quantity of output bits, the fullness status of the bitstream buffer, and the target quantity of bits is merely an example for description. There may be another correspondence in a specific implementation. This is not limited in this embodiment of this application.

If an estimated quantity of encoded bits output after encoding is less than the target quantity of bits of the to-be-encoded block, the first encoding QP may be decreased to increase a bit rate of the to-be-encoded block, to improve image compression quality. If the estimated quantity of encoded bits output after encoding is greater than the target quantity of bits of the to-be-encoded block, and the bitstream buffer is full, it indicates that the bitstream buffer may overflow. In this case, the first encoding QP may be increased to reduce the bit rate, to ensure that the bitstream buffer does not overflow.

Possibly, the encoding result information includes the encoding distortion magnitude of the to-be-encoded block obtained by using the first encoding QP. When encoding distortion is less than a first threshold, the first encoding QP is increased. When the encoding distortion is greater than a second threshold, the first encoding QP is decreased.

Specifically, for spatial-domain encoding, the encoding distortion magnitude may be a difference between residual information obtained before quantization and residual information obtained after dequantization. For frequency domain encoding, the encoding distortion magnitude may be a difference between residual information obtained before transformation and residual information obtained after inverse transformation, or may be a difference between residual information obtained after transformation and before quantization and residual information obtained after dequantization and before inverse transformation.

When the encoding distortion is less than a specified threshold, it indicates that quality of an encoded image is good. In this case, the first encoding QP may be increased to reduce the quantity of encoded bits. When the encoding distortion is greater than the specified threshold, it indicates that the quality of the encoded image is poor. In this case, the first encoding QP needs to be decreased to improve image quality.

Possibly, the encoding result information includes the texture complexity of the to-be-encoded block. The first encoding QP is decreased when a texture of the to-be-encoded block is simple. The first encoding QP is increased when the texture of the to-be-encoded block is complex.

A simpler texture of the to-be-encoded block indicates more obvious image distortion caused by quantization and more perceptible to human eyes. The first encoding QP may be decreased to increase a bit rate, so as to ensure that the image distortion is not perceived by human eyes. A more complex texture of the to-be-encoded block indicates less obvious image distortion caused by quantization and less perceptible to human eyes. The first encoding QP may be increased to reduce the bit rate.

Possibly, the encoding result information includes the prediction residual of the to-be-encoded block. When an absolute value of the prediction residual is less than a third threshold, the first encoding QP is decreased. When the absolute value of the prediction residual is greater than a fourth threshold, the first encoding QP is increased.

The prediction residual may reflect the texture complexity of the to-be-encoded block. A smaller prediction residual indicates a simpler texture of the to-be-encoded block. A larger prediction residual indicates a more complex texture of the to-be-encoded block. A simpler texture of the to-be-encoded block indicates more obvious image distortion caused by quantization and more perceptible to human eyes. The first encoding QP may be decreased to reduce the distortion, to ensure that the image distortion is not perceived by human eyes. A more complex texture of the to-be-encoded block indicates less obvious image distortion caused by quantization and less perceptible to human eyes. The first encoding QP may be increased to reduce the bit rate.

Possibly, the encoding result information may include any two or more of the foregoing items. Specifically, an adjustment amount of the first encoding QP corresponding to each item may be determined, and then a final adjustment amount of the first encoding QP may be calculated based on a weight of each item, to obtain the second QP.

S604: Perform real encoding on the to-be-encoded block by using the second encoding QP.

Specifically, the real encoding may include real spatial-domain encoding or real frequency domain encoding. The real spatial-domain encoding may include prediction, quantization, and entropy encoding. The real frequency domain encoding may include prediction, transformation, quantization, and entropy encoding. A quantization step is determined based on the second encoding QP. Data output after entropy encoding is data obtained after the to-be-encoded block is compressed.

Specifically, the prediction may be a determinion of a prediction value and a prediction residual of the to-be-encoded block based on a prediction reference direction and a prediction value calculation method that correspond to a prediction mode.

The transformation may be performing frequency domain transformation on the prediction residual, to obtain a transform coefficient in a transform domain.

Quantization in the spatial-domain precoding may be quantizing the prediction residual by using the first encoding QP. Quantization in the frequency domain precoding may be quantizing the transform coefficient by using the first encoding QP.

The entropy encoding may be encoding with no information loss according to an entropy principle. A mode such as Shannon coding, Huffman coding, or arithmetic coding is usually applied to encode a quantized prediction residual (real spatial-domain encoding) or a quantized transform coefficient (real frequency domain encoding).

In this embodiment of this application, the to-be-encoded block is first precoded by using the first encoding QP, and the first encoding QP is adjusted based on the precoding result information to obtain the second encoding QP. Then, real encoding is performed on the to-be-encoded block by using the second encoding QP. The first encoding QP is adjusted based on the precoding result information, so that more refined bit rate control can be implemented. A bit rate is properly used to transfer image data with better quality, to improve image compression performance.

Figure 7:
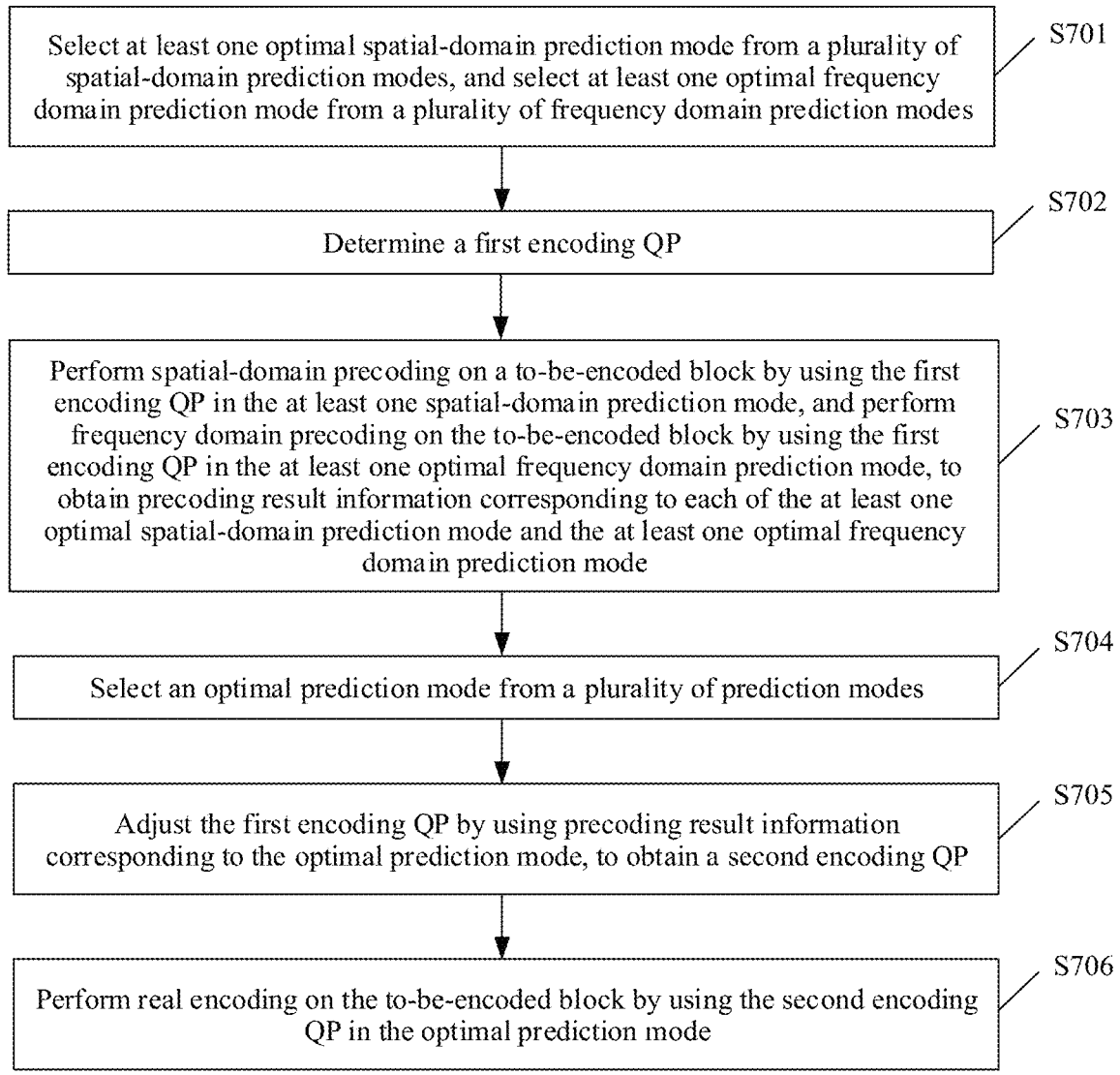
FIG. 7 is a schematic flowchart of another encoding method according to an embodiment of this application.

An embodiment of this application further provides another encoding method. As shown in FIG. 7, the encoding method may include at least the following steps.

S701: Select at least one optimal spatial-domain prediction mode from a plurality of spatial-domain prediction modes, and select at least one optimal frequency domain prediction mode from a plurality of frequency domain prediction modes.

Specifically, the spatial-domain prediction mode may be point-level prediction or block-level prediction. Different spatial-domain prediction modes correspond to different prediction reference directions and different prediction value calculation methods. The frequency domain prediction mode may be block-level prediction. Different frequency domain prediction modes correspond to different prediction reference directions and different prediction value calculation methods.

Specifically, the at least one optimal spatial-domain prediction mode is at least one prediction spatial-domain mode whose encoding cost is ranked high in ascending order of encoding costs in the plurality of spatial-domain prediction modes, and the at least one optimal frequency domain prediction mode is at least one prediction mode whose encoding cost is ranked high in ascending order of encoding costs in the plurality of frequency domain prediction modes. The ranking is not limited to ranking in the ascending order of encoding costs. In a specific implementation, the encoding costs may be further ranked in descending order. The at least one optimal spatial-domain prediction mode (or optimal frequency domain prediction mode) is at least one prediction spatial-domain mode (or optimal frequency domain prediction mode) ranked last in descending order of encoding costs in the plurality of spatial-domain prediction modes (or frequency domain prediction modes). In this embodiment of this application, a S701 process may be referred to as pre-analysis.

An encoding cost calculation rule in a pre-analysis phase may be any one of the following: an SAD of residual information, an MAD of residual information, an SSE of residual information, an MSE of residual information, an encoding bit rate R, an RDCOST, an encoding distortion magnitude, and the like. The encoding distortion magnitude may be measured by using a measure such as an SAD, an MAD, an SSE, and an MSE. The residual information is a difference between an original value and a prediction value.

Encoding cost values of spatial-domain precoding and frequency domain precoding may be calculated according to the encoding cost rule. An encoding cost value is usually directly proportional to an encoding cost. However, in some calculation rules, the encoding cost value may alternatively be inversely proportional to the encoding cost. For example, the encoding cost value is a sum of reciprocals of prediction residuals of all pixels. In such calculation rule in which the encoding cost value is inversely proportional to the prediction residual, the encoding cost value is inversely proportional to the encoding cost.

The encoding cost calculation rule in the pre-analysis phase is not limited in this embodiment of this application. However, an optimal prediction mode is always a prediction mode with a smallest encoding cost for any encoding cost calculation rule.

S702: Determine a first encoding QP.

Specifically, S702 is the same as S601, and details are not described herein again.

S703: Perform spatial-domain precoding on a to-be-encoded block by using the first encoding QP in the at least one optimal spatial-domain prediction mode, and perform frequency domain precoding on the to-be-encoded block by using the first encoding QP in the at least one optimal frequency domain prediction mode, to obtain precoding result information corresponding to each of the at least one optimal spatial-domain prediction mode and the at least one optimal frequency domain prediction mode.

Specifically, the precoding may include spatial-domain precoding and frequency domain precoding. The spatial-domain precoding may include prediction, quantization, and cost calculation. The frequency domain precoding may include prediction, transformation, quantization, and cost calculation. The optimal spatial-domain prediction mode determines a prediction value of the to-be-encoded block and further determines residual information of the to-be-encoded block. The optimal frequency domain mode also determines the prediction value of the to-be-encoded block and further determines the residual information of the to-be-encoded block.

S704: Select the optimal prediction mode from a plurality of prediction modes.

Specifically, the optimal prediction mode is a prediction mode with a smallest encoding cost in the at least one optimal spatial-domain prediction mode and the at least one optimal frequency domain prediction mode.

S705: Adjust the first encoding QP by using precoding result information corresponding to the optimal prediction mode to obtain a second encoding QP.

Specifically, different prediction modes correspond to different precoding result information in a precoding phase. After the optimal prediction mode is determined, the first encoding QP can be adjusted based on the precoding result information corresponding to the optimal prediction mode. For a specific adjustment manner, refer to related descriptions in S603. Details are not described herein again.

It can be learned that, when the first encoding QP is adjusted based on texture complexity of the to-be-encoded block, the texture complexity of the to-be-encoded block may be determined based on a prediction residual corresponding to each prediction mode in S701. Specifically, a prediction reference direction of a prediction mode with a smaller prediction residual may represent texture information of the to-be-encoded block to some extent. This is not limited to the prediction residual. In a specific implementation, the texture complexity of the to-be-encoded block may be alternatively determined in another mode. This is not limited in this embodiment of this application.

S706: Perform real encoding on the to-be-encoded block by using the second encoding QP in the optimal prediction mode.

Specifically, if the optimal prediction mode is the optimal spatial-domain prediction mode, the to-be-encoded block is predicted by using the optimal spatial-domain mode to output a prediction value and a prediction residual. Then, quantization, entropy encoding, and the like are performed on the prediction residual.

If the optimal prediction mode is the optimal frequency domain prediction mode, the to-be-encoded block is predicted by using the optimal frequency domain mode to output a prediction value and a prediction residual. Then, transformation, quantization, entropy encoding, and the like are performed on the prediction residual.

In an encoding architecture provided in this embodiment of this application, a plurality of prediction modes may be provided for each of a spatial-domain branch and a frequency domain branch through pre-analysis. In this case, more refined point-level prediction (that is, a reconstruction value in a current prediction block may be used as a prediction reference value for a subsequent pixel in the current prediction block) can be performed without performing a prediction operation in the form of a block (that is, a prediction operation in spatial-domain encoding), to improve image compression performance through the more refined point-level prediction. Further, in this embodiment of this application, more refined bit rate control can be implemented through two-level bit rate control. A bit rate is properly used to transfer image data with better quality, to improve image compression performance.

With reference to the encoding methods provided in FIG. 6 and FIG. 7, the following describes an encoding architecture provided in an embodiment of this application.

Figure 8:
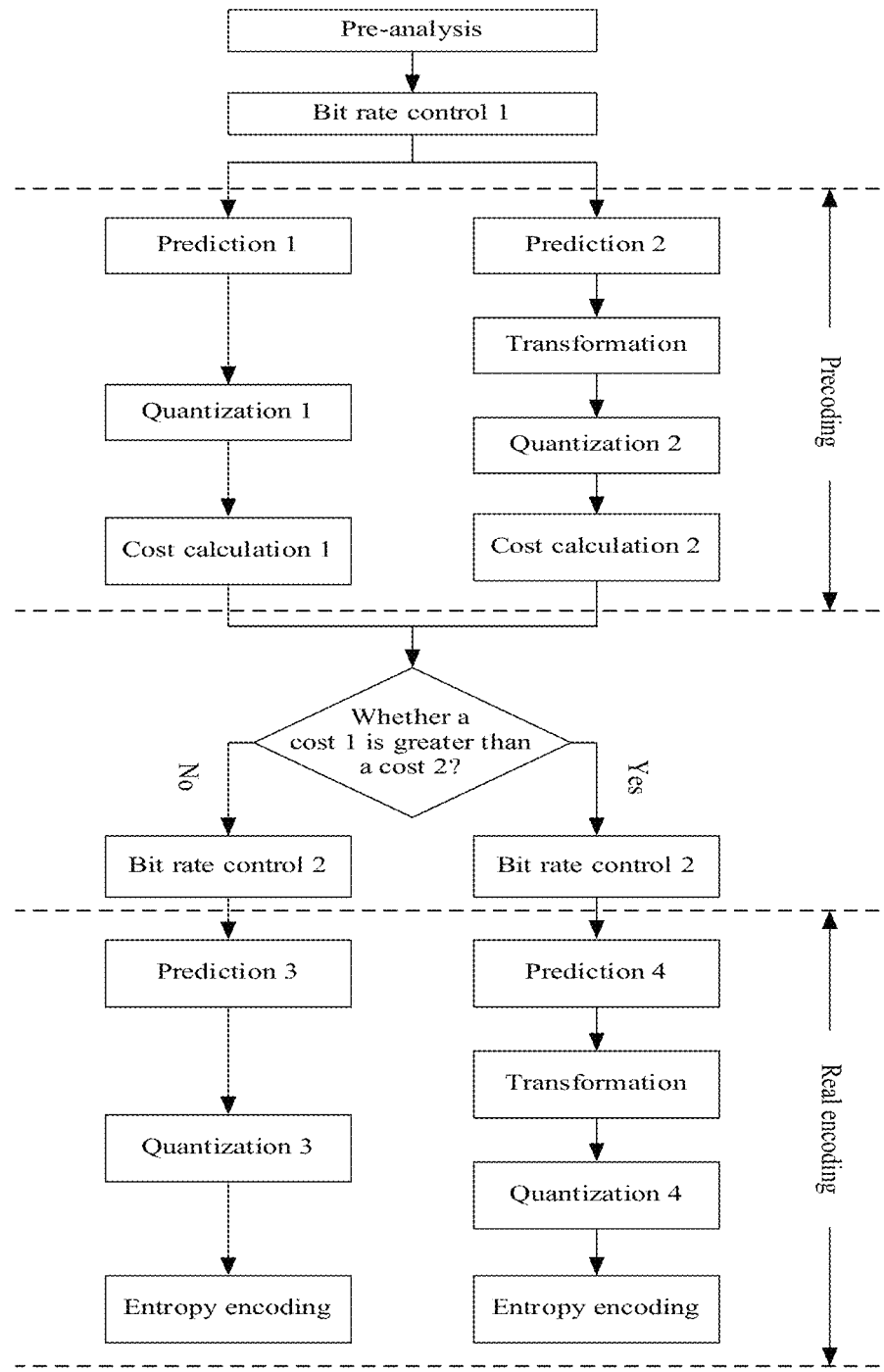
FIG. 8 is a schematic diagram of an encoding architecture according to an embodiment of this application.

FIG. 8 shows an example of an encoding architecture according to an embodiment of this application.

As shown in FIG. 8, the architecture may include the following parts: pre-analysis, bit rate control 1, precoding, encoding domain decision, bit rate control 2, and real encoding.

The pre-analysis part may implement S701, and is used to select an optimal spatial-domain prediction mode from a plurality of spatial-domain prediction modes and select an optimal frequency domain prediction mode from a plurality of frequency domain prediction modes. For details, refer to descriptions in S701. Details are not described herein.

The bit rate control 1 part may be used to determine a first encoding QP. The first encoding QP may be determined based on texture complexity of a to-be-encoded block and/or a fullness status of a bitstream buffer. For details, refer to descriptions in S601. Details are not described herein.

The precoding part may be used to implement spatial-domain precoding (prediction 1, quantization 1, and cost calculation 1) and frequency domain precoding (prediction 2, transformation, quantization 2, and cost calculation 2). Quantization parameters of the quantization 1 and the quantization 2 are the first encoding QP. A prediction reference direction in the prediction 1 may be determined based on the optimal spatial-domain prediction mode, and a prediction reference direction in the prediction 2 may be determined based on the optimal frequency domain prediction mode. For a calculation rule of encoding costs in the cost calculation 1 and the cost calculation 2, refer to related descriptions in S701. Details are not described herein again.

The precoding part is not limited to one spatial-domain precoding branch and one frequency domain precoding branch shown in FIG. 8. In a specific implementation, there may alternatively be a plurality of spatial-domain precoding branches and a plurality of frequency domain precoding branches. This is not limited in this embodiment of this application.

The encoding domain decision part is used to compare encoding cost values output through the cost calculation 1 and the cost calculation 2, and determine, based on a comparison result, whether the real encoding is real spatial-domain encoding or real frequency domain encoding. If it is determined, based on the encoding cost values output through the calculation 1 and the cost calculation 2, that an encoding cost 1 is less than an encoding cost 2, it may be determined that the optimal spatial-domain prediction mode is a prediction mode with a smallest encoding cost, and the real encoding is real spatial-domain encoding. If it is determined, based on the encoding cost values output through the calculation 1 and the cost calculation 2, that the encoding cost 1 is greater than the encoding cost 2, it may be determined that the optimal frequency domain prediction mode is a prediction mode with a smallest encoding cost, and the real encoding is real frequency domain encoding.

It can be learned that, when an encoding cost of the optimal spatial-domain prediction mode is equal to an encoding cost of the optimal frequency domain prediction mode, because a calculation amount of spatial-domain encoding is less than a calculation amount (transformation) of frequency domain encoding, real spatial-domain encoding may be preferably selected as real encoding.

After the optimal prediction mode is determined, the first encoding QP is adjusted based on precoding result information of the optimal prediction mode, and this process may correspond to the bit rate control 2.

The real encoding part may be used to implement real spatial-domain encoding (prediction 3, quantization 3, and entropy encoding) or real frequency domain encoding (prediction 4, transformation, quantization 4, and entropy encoding). This may be specifically determined based on the optimal prediction mode output by a cost determining part.

Generally, residual information in a spatial-domain branch and a transform coefficient in a frequency domain branch have different characteristics (for example, distribution of amplitude values), so that the spatial-domain branch and the frequency domain branch have different quantization modules and entropy encoding modules. In a specific implementation, to reduce logic implementation costs, these differences may be ignored, so that the spatial-domain branch and the frequency domain branch use a unified quantization module and a unified entropy encoding module. Similarities and differences between the quantization modules and the entropy encoding modules of the spatial-domain branch and the frequency domain branch are not limited in this embodiment of this application.

In the encoding architecture provided in this embodiment of this application, a plurality of prediction modes may be provided for each of the spatial-domain branch and the frequency domain branch through pre-analysis. In this case, more refined point-level prediction (that is, a reconstruction value in a current prediction block may be used as a prediction reference value for a subsequent pixel in the current prediction block) can be performed without performing a prediction operation in a form of a block (that is, a prediction operation in spatial-domain encoding), to improve image compression performance through the more refined point-level prediction. Further, in this embodiment of this application, more refined bit rate control can be implemented through two-level bit rate control. A bit rate is properly used to transfer image data with better quality, to improve image compression performance.

Based on the encoding architecture provided in FIG. 8, an embodiment of this application further provides an encoding architecture for pixel reconstruction.

Figure 9A:
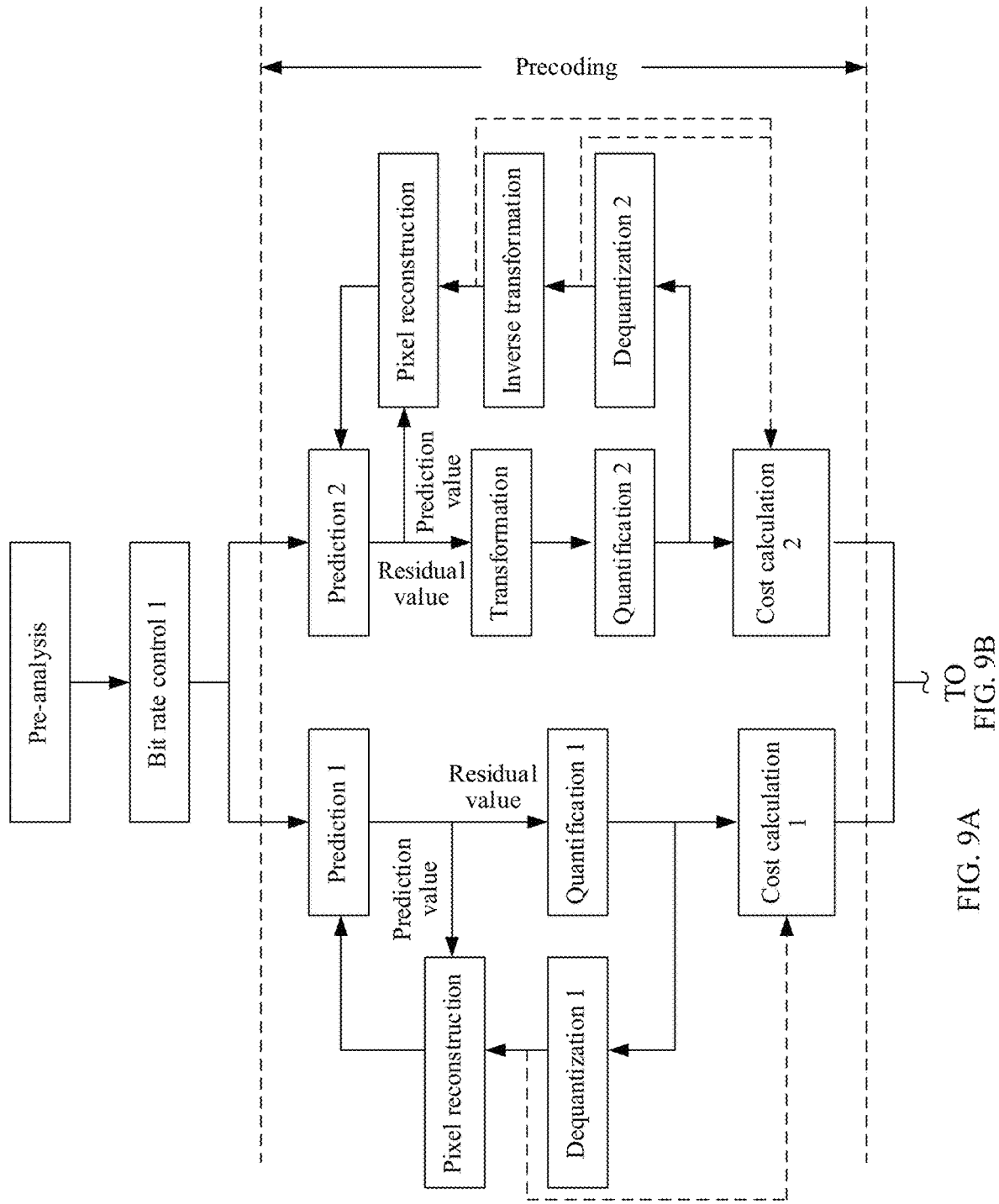
FIG. 9A and FIG. 9B are a schematic diagram of an encoding architecture for pixel reconstruction according to an embodiment of this application.
Figure 9B:
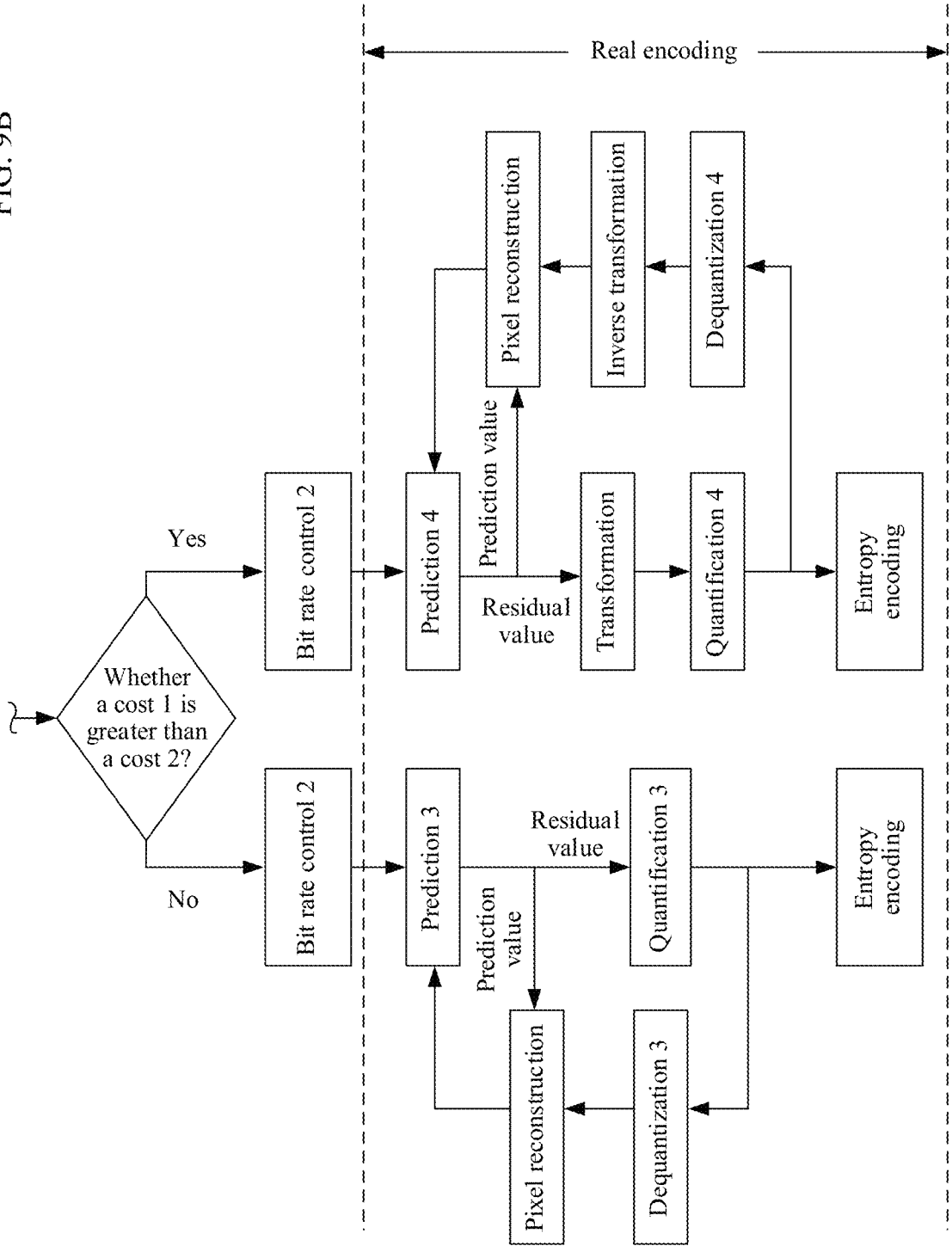

As shown in FIG. 9A and FIG. 9B, when the to-be-encoded block is precoded by using the first encoding QP, pixel reconstruction may be further performed on the to-be-encoded block to obtain a reconstructed pixel of the to-be-encoded block in a precoding phase.

Specifically, pixel reconstruction may be performed after quantization. It can be learned that the to-be-encoded block may include one or more pixels. Pixel reconstruction is performed in a form of a pixel.

For spatial-domain precoding, pixel reconstruction may be performed after the quantization 1. Specifically, dequantization (dequantization 1) may be performed on a quantized residual value, and then summation is performed based on a prediction value output through the prediction 1 and a dequantized residual value, to obtain a reconstructed pixel of a pixel in the to-be-encoded block in the precoding phase. The reconstructed pixel may be used as a prediction reference value for a subsequent pixel, and is used for prediction 1 in a precoding phase of the subsequent pixel.

For frequency domain encoding, pixel reconstruction may be performed after the quantization 2. Specifically, dequantization (dequantization 2) and inverse transformation may be performed on a quantized residual value, and then summation is performed on a prediction value output through the prediction 2 and a residual value obtained after inverse transformation, to obtain a reconstructed pixel of a pixel in the to-be-encoded block in the precoding phase. The reconstructed pixel may be used as a prediction reference value for a subsequent pixel, and is used for prediction 2 in a precoding phase of the subsequent pixel.

In addition, if a cost calculation rule is an encoding distortion magnitude or RDCOST, a result obtained after the dequantization 1 may be used for the cost calculation 1 (a dashed line in the figure), and both a result obtained after the dequantization 2 and a result obtained after inverse transformation may be used for the cost calculation 2 (dashed lines in the figure).

For spatial-domain precoding, the encoding distortion magnitude may be a difference between a residual value obtained before quantization and a residual value obtained after dequantization. For frequency domain precoding, the encoding distortion magnitude may be a difference between a residual value obtained before transformation and a residual value obtained after inverse transformation, or may be a difference between a residual value obtained after transformation and before quantization and a residual value obtained after dequantization and before inverse transformation.

When real encoding is performed on the to-be-encoded block by using a second encoding QP, pixel reconstruction may be further performed on the to-be-encoded block to obtain a reconstructed pixel of the to-be-encoded block in a real encoding phase.

Specifically, pixel reconstruction may be performed after quantization and before entropy encoding. It can be learned that the to-be-encoded block may include one or more pixels. Pixel reconstruction is performed in a form of a pixel.

For real spatial-domain encoding, pixel reconstruction may be performed after the quantization 3 and before entropy encoding. Specifically, dequantization (dequantization 3) may be performed on a quantized residual value, and then summation is performed based on a prediction value output through the prediction 3 and a dequantized residual value, to obtain a reconstructed pixel of a pixel in the to-be-encoded block in a real encoding phase. The reconstructed pixel may be used as a prediction reference value for a subsequent pixel, and is used for prediction 3 in a real encoding phase of the subsequent pixel.

For frequency domain encoding, pixel reconstruction may be performed after the quantization 4 and before entropy encoding. Specifically, dequantization (dequantization 4) and inverse transformation may be performed on a quantized residual value, and then summation is performed on a prediction value output through the prediction 4 and a residual value obtained after inverse transformation, to obtain a reconstructed pixel of a pixel in the to-be-encoded block in a real encoding phase. The reconstructed pixel may be used as a prediction reference value for a subsequent pixel, and is used for prediction 4 in a real encoding phase of the subsequent pixel.

In the foregoing encoding architecture for pixel reconstruction provided in FIG. 9A and FIG. 9B, pixel reconstruction loops are respectively provided for the spatial-domain branch and the frequency domain branch in a precoding phase. In some possible embodiments, to reduce a calculation amount of the architecture for pixel reconstruction shown in FIG. 9A and FIG. 9B, the pixel reconstruction loop may be provided for the spatial-domain branch only in the precoding phase, and a reconstructed pixel of the spatial-domain branch may be directly used for the frequency domain branch. In other words, the reconstructed pixel may be used as a prediction reference value for a subsequent pixel, and is used for prediction 1 and prediction 2 in a precoding phase of the subsequent pixel.

Figure 10A:
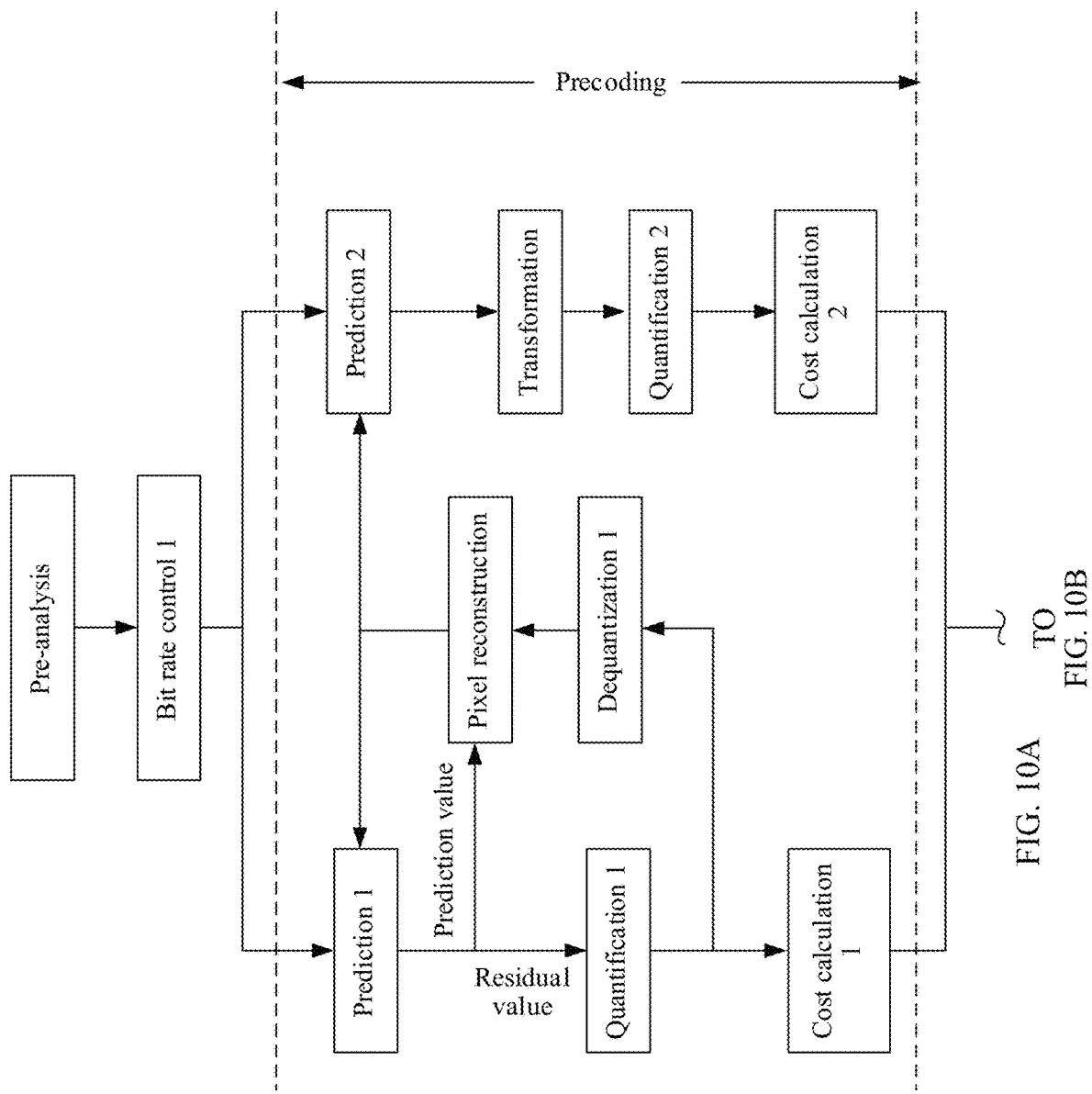
FIG. 10A and FIG. 10B are a schematic diagram of another encoding architecture for pixel reconstruction according to an embodiment of this application.
Figure 10B:
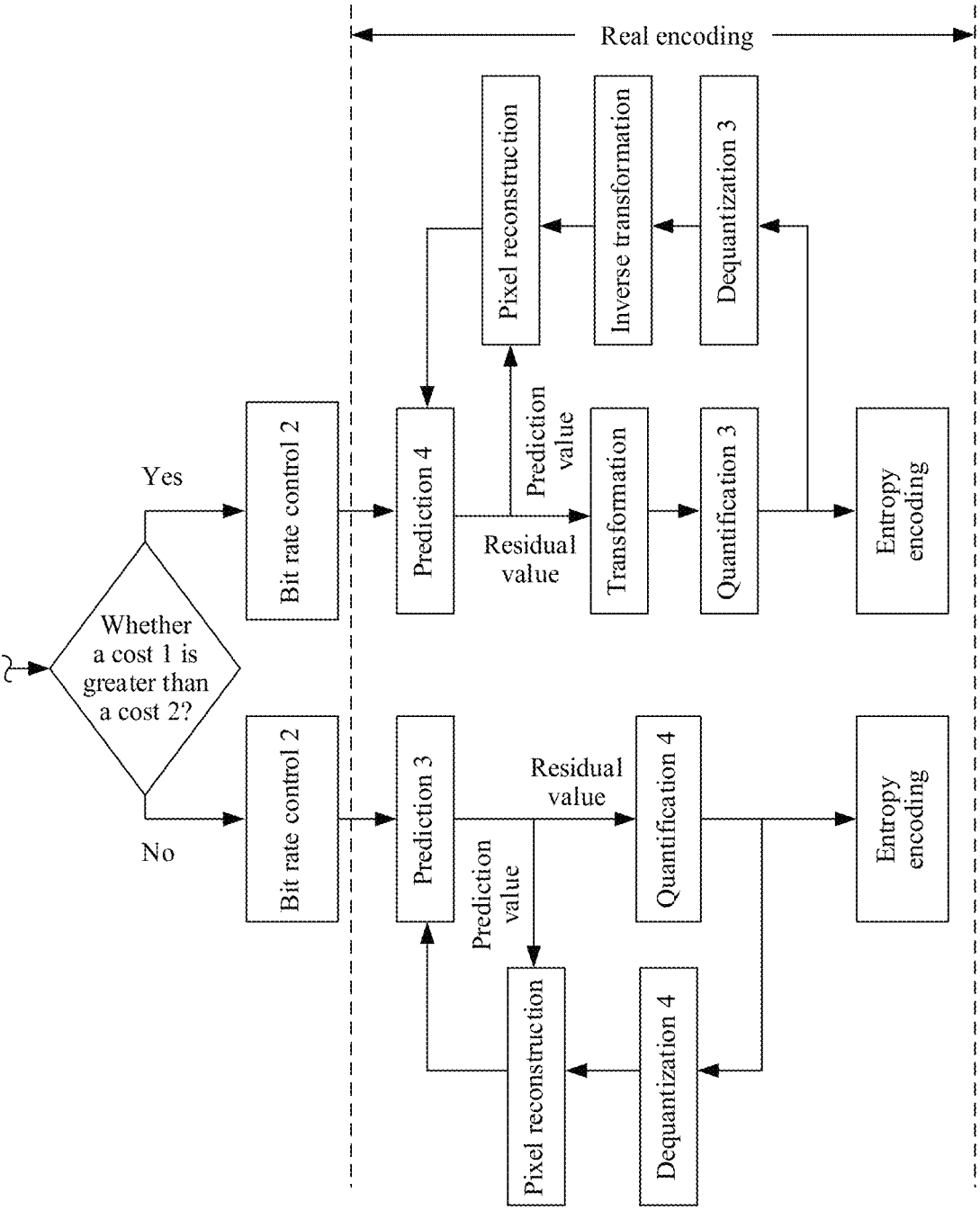

An embodiment of this application further provides another encoding architecture for pixel reconstruction. As shown in FIG. 10A and FIG. 10B, compared with FIG. 9A and FIG. 9B, in FIG. 10A and FIG. 10B, the pixel reconstruction loop (dequantization 2, inverse transformation, and pixel reconstruction) of the frequency domain branch in the precoding phase is removed, and a pixel reconstruction result of the spatial-domain branch is directly used for the prediction 1 and the prediction 2. To be specific, a reconstructed pixel of a spatial-domain branch of a current pixel in the precoding phase may be used as a prediction reference value for a subsequent pixel, and is used for prediction 1 and prediction 2 in the precoding phase of the subsequent pixel. In this way, the encoding architecture can be simplified, a calculation amount of the frequency domain branch in the precoding phase can be reduced, and encoding efficiency can be increased.

With reference to the encoding architecture for pixel reconstruction provided in FIG. 9A and FIG. 9B or FIG. 10A and FIG. 10B, the following describes an encoding mode provided in an embodiment of this application.

First, a time sequence for encoding each coding block in the embodiments of this application is described.

Figure 11:
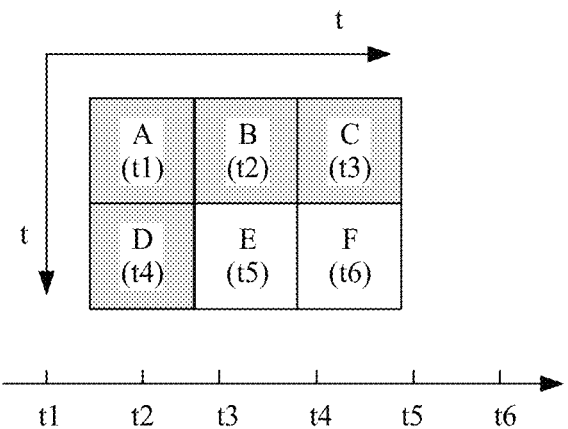
FIG. 11 is a schematic diagram of a time sequence for encoding each coding block according to an embodiment of this application.

As shown in FIG. 11, it is assumed that a current encoded image may be divided into six coding blocks: A, B, C, D, E and F, and the six coding blocks are arranged in a 2*3 form. Encoding time sequences of the coding blocks may be sequentially from left to right and from top to bottom. For example, an encoding moment of the coding block A is t1, an encoding moment of the coding block B is t2, an encoding moment of the coding block C is t3, an encoding moment of the coding block D is t4, an encoding moment of the coding block E is t5, and an encoding moment of the coding block F is t6, where t1 is earlier than t2, t2 is earlier than t3, t3 is earlier than t4, t4 is earlier than t5, and t5 is earlier than t6.

It is assumed that the current coding blocks A, B, C, and D have all been encoded, and a to-be-encoded block is the coding block E. The coding block E needs to use at least a reconstructed pixel of the coding block D as a prediction reference value. For example, the to-be-encoded block E may use only the reconstructed pixel of the coding block D as the prediction reference value, or the to-be-encoded block E may use reconstructed pixels of the coding block A, the coding block B, the coding block C, and the coding block D as prediction reference values. The following uses an example in which the to-be-encoded block E may use only the reconstructed pixel of the coding block D as a prediction reference value for description.

Figure 12:
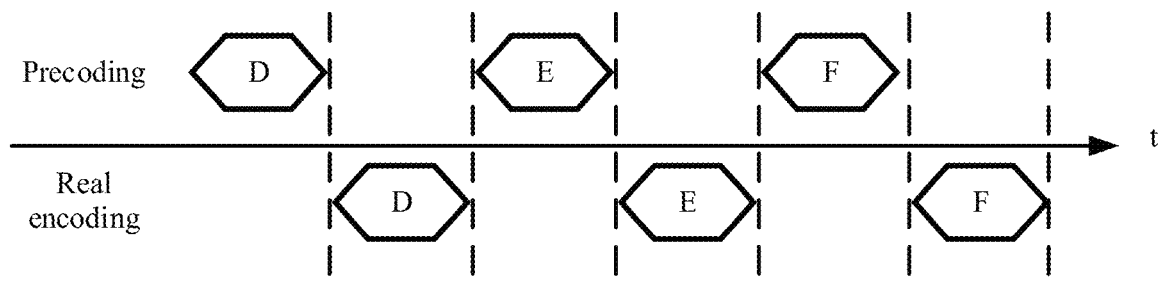
FIG. 12 is a schematic diagram of an existing encoding pipeline.

In the conventional technology, the to-be-encoded block E needs to use a reconstructed pixel of the coding block D in a real encoding phase as a prediction reference value in both a precoding phase and a real encoding phase. In this case, precoding of the to-be-encoded block E may be performed only after real encoding of D is completed. As shown in FIG. 12, precoding and real encoding of the coding blocks are separately performed in series, resulting in low encoding efficiency.

Figure 13:
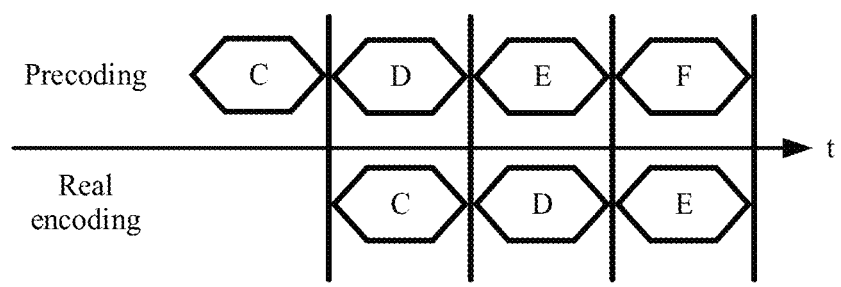
FIG. 13 is a schematic diagram of an encoding pipeline according to an embodiment of this application.

To increase the encoding efficiency, an embodiment of this application provides a new encoding mode. In the precoding phase, the coding block E uses only a reconstructed pixel of the coding block D in a precoding phase as a prediction reference value. In addition, in the real encoding phase, the coding block E uses only the reconstructed pixel of the coding block D in the real encoding phase as a prediction reference value. In this way, the precoding phase of the coding block E may not depend on the real encoding phase of the coding block D, so that precoding of the coding block E and real encoding of the coding block D may be performed in parallel, as shown in FIG. 13, thereby increasing the encoding efficiency.

It can be seen from the foregoing descriptions that, the prediction 1 and the prediction 3 in FIG. 9A and FIG. 9B or FIG. 10A and FIG. 10B may use a same prediction mode (the optimal spatial-domain prediction mode), but the prediction 1 and the prediction 3 may have different prediction reference values. For example, the prediction 1 may use a reconstructed pixel of a previous coding block in a precoding phase as a prediction reference value. The prediction 3 uses a reconstructed pixel of the previous coding block in a real encoding phase as a prediction reference value.

Similarly, the prediction 2 and the prediction 4 in FIG. 9A and FIG. 9B or FIG. 10A and FIG. 10B may use the same prediction mode (the optimal frequency domain prediction mode), but the prediction 2 and the prediction 4 may have different prediction reference values.

In this embodiment of this application, the coding block E may be referred to as a to-be-encoded block, the coding block D may be referred to as a previous coding block of the coding block E, and the coding block F may be referred to as a next coding block of the coding block E. To be specific, a previous coding block of the to-be-encoded block and the to-be-encoded block are adjacent in an encoding time sequence, and an encoding time period (or moment) of the previous coding block is earlier than an encoding time period (or moment) of the to-be-encoded block. A next coding block of the to-be-encoded block and the to-be-encoded block are adjacent in an encoding time sequence, and an encoding time period (or moment) of the next coding block is later than the encoding time period (or moment) of the to-be-encoded block.

It can be learned that, when the to-be-encoded block is precoded by using the first encoding QP, pixel reconstruction may be further performed on the to-be-encoded block to obtain the reconstructed pixel of the to-be-encoded block in the precoding phase.

After the to-be-encoded block is precoded by using the first encoding QP, the next coding block of the to-be-encoded block may be further precoded with reference to the reconstructed pixel of the to-be-encoded block in the precoding phase.

The precoding the to-be-encoded block by using the first encoding QP in S602 may be precoding the to-be-encoded block by using at least a reconstructed pixel of the previous coding block of the to-be-encoded block in the precoding phase as a prediction reference value and by using the first encoding QP.

In this embodiment of this application, precoding of the to-be-encoded block depends only on the reconstructed pixel of the previous coding block in the precoding phase and a reconstructed pixel of another encoded reference coding block in real encoding, and does not depend on the reconstructed pixel of the previous coding block in the real encoding phase. In this way, real encoding of the previous coding block and precoding of the to-be-encoded block can be performed synchronously, to increase encoding efficiency.

Figure 14:
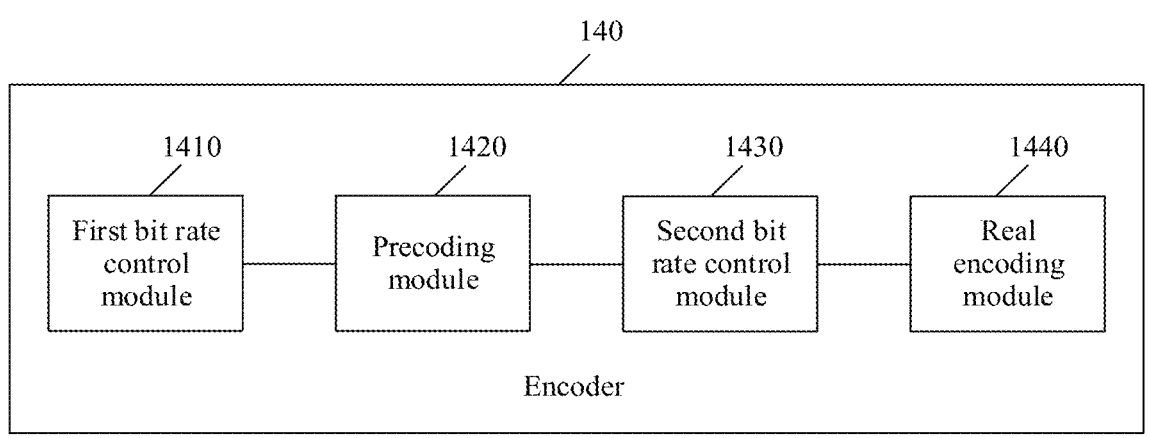
FIG. 14 is a schematic diagram of a structure of an encoder according to an embodiment of this application.

An embodiment of this application further provides an encoder. As shown in FIG. 14, an encoder 140 may include at least a first rate control module 1410, a precoding module 1420, a second rate control module 1430, and a real encoding module 1440.

The first bit rate control module 1410 may be configured to determine a first encoding quantization parameter QP. For detailed descriptions, refer to the descriptions in S601. Details are not described herein again.

The precoding module 1420 may be configured to precode a to-be-encoded block by using the first encoding QP to obtain precoding result information. For detailed descriptions, refer to the descriptions in S602. Details are not described herein again.

The second bit rate control module 1430 may be configured to adjust the first encoding QP based on the precoding result information to obtain a second encoding QP. For detailed descriptions, refer to the descriptions in S603. Details are not described herein again.

The real encoding module 1440 may be configured to perform real encoding on the to-be-encoded block by using the second encoding QP. For detailed descriptions, refer to the descriptions in S604. Details are not described herein again.

In a possible embodiment, the precoding module 1420 may be specifically configured to precode the to-be-encoded block by using the first encoding QP in each of a plurality of prediction modes to obtain precoding result information corresponding to the prediction mode.

The encoder 140 may further include a selection module that may be configured to select an optimal prediction mode from the plurality of prediction modes. For a basis for selecting the optimal prediction mode, refer to related descriptions in S704. Details are not described herein again.

The second bit rate control module 1430 may be specifically configured to adjust the first encoding QP by using encoding result information corresponding to the optimal prediction mode, to obtain the second encoding QP. For detailed descriptions, refer to the descriptions in S705. Details are not described herein again.

The real encoding module 1440 may be specifically configured to perform real encoding on the to-be-encoded block by using the second encoding QP in the optimal prediction mode. For detailed descriptions, refer to the descriptions in S706. Details are not described herein again.

In a possible embodiment, the encoder 140 may further include: a pre-analysis module that may be configured to select at least one optimal spatial-domain prediction mode from a plurality of spatial-domain prediction modes, and select at least one optimal frequency domain prediction mode from a plurality of frequency domain prediction modes. The at least one optimal spatial-domain prediction mode is at least one prediction mode with a smallest encoding cost in the plurality of spatial-domain prediction modes, the at least one optimal frequency domain prediction mode is at least one prediction mode with a smallest encoding cost in the plurality of frequency domain prediction modes, and different prediction modes correspond to different prediction reference directions and different prediction value calculation methods. For detailed descriptions, refer to the descriptions in S701. Details are not described herein again.

The precoding module 1420 may be specifically configured to perform spatial-domain precoding on the to-be-encoded block by using the first encoding QP in the optimal spatial-domain prediction mode, and perform frequency domain precoding on the to-be-encoded block by using the first encoding QP in the at least one optimal frequency domain prediction mode. For detailed descriptions, refer to the descriptions in S703. Details are not described herein again.

In a possible embodiment, the encoder 140 may further include a pixel reconstruction module, configured to: when the precoding module 1420 precodes the to-be-encoded block by using the first encoding QP, perform pixel reconstruction on the to-be-encoded block to obtain a reconstructed pixel of the to-be-encoded block in a precoding phase.

The precoding module 1420 may be further configured to precode a next coding block of the to-be-encoded block with reference to the reconstructed pixel of the to-be-encoded block in the precoding phase.

In a possible embodiment, the precoding module 1420 may include a prediction unit, a quantization unit, and a cost calculation unit.

The prediction unit may be configured to predict the to-be-encoded block to obtain residual information.

The quantization unit may be configured to quantize the residual information by using the first encoding QP.

The cost calculation unit may be configured to calculate an encoding cost based on quantized residual information.

The to-be-encoded block is specifically precoded by using the first encoding QP after the residual information is quantized by using the first encoding QP.

In a possible embodiment, the precoding module 1420 may be specifically configured to precode the to-be-encoded block by using at least a reconstructed pixel of a previous coding block of the to-be-encoded block in a precoding phase as a prediction reference value and by using the first encoding QP, where the previous coding block and the to-be-encoded block are adjacent in an encoding time sequence, and an encoding time period of the previous coding block is earlier than an encoding time period of the to-be-encoded block.

In a possible embodiment, the first bit rate control module 1410 may be specifically configured to determine the first encoding QP based on texture complexity of the to-be-encoded block and/or a fullness status of a bitstream buffer. For detailed descriptions, refer to the descriptions in S601. Details are not described herein again.

In a possible embodiment, a more complex texture of the to-be-encoded block indicates a larger first encoding QP, and a simpler texture of the to-be-encoded block indicates a smaller first encoding QP. A fuller bitstream buffer indicates a larger first encoding QP, and a less full bitstream buffer indicates a smaller first encoding QP.

In a possible embodiment, the precoding result information includes at least one of the following: a quantity of encoded bits of the to-be-encoded block obtained by using the first encoding QP, an encoding distortion magnitude of the to-be-encoded block obtained by using the first encoding QP, an encoding rate-distortion cost of the to-be-encoded block obtained by using the first encoding QP, a prediction residual of the to-be-encoded block, and the texture complexity of the to-be-encoded block.

In a possible embodiment, the encoding result information includes the quantity of encoded bits of the to-be-encoded block obtained by using the first encoding QP. The second rate control module 1430 may be specifically configured to: decrease the first encoding QP when the quantity of encoded bits is less than a target quantity of bits; or increase the first encoding QP when the quantity of encoded bits is greater than the target quantity of bits, where the target quantity of bits depends on the fullness status of the bitstream buffer and a quantity of output bits of the bitstream buffer.

In an encoding architecture provided in this embodiment of this application, a plurality of prediction modes may be provided for each of a spatial-domain branch and a frequency domain branch through pre-analysis. In this case, more refined point-level prediction (that is, a reconstruction value in a current prediction block may be used as a prediction reference value for a subsequent pixel in the current prediction block) can be performed without performing a prediction operation in a form of a block (that is, a prediction operation in spatial-domain encoding), to improve image compression performance through the more refined point-level prediction. Further, in this embodiment of this application, more refined bit rate control can be implemented through two-level bit rate control. A bit rate is properly used to transfer image data with better quality, to improve image compression performance. In addition, in this embodiment of this application, precoding of the to-be-encoded block depends only on the reconstructed pixel of the previous coding block in the precoding phase, and depends on a reconstructed pixel of another encoded reference coding block in a real encoding phase, and does not depend on a reconstructed pixel of the previous coding block in a real encoding phase, so that real encoding of the previous coding block and precoding of the to-be-encoded block can be performed synchronously, to increase encoding efficiency.

An embodiment of this application further provides a computer-readable storage medium. The computer-readable storage medium stores instructions. When the instructions are run on a computer or a processor, the computer or the processor is enabled to perform one or more steps in any one of the foregoing methods. When the modules in the foregoing signal processing apparatus are implemented in a form of a software function unit and sold or used as an independent product, the modules may be stored in the computer-readable storage medium.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium, or may be transmitted through the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

A person of ordinary skill in the art may understand that all or some of the processes of the methods in the embodiments may be implemented by a computer program instructing relevant hardware. The program may be stored in a computer-readable storage medium. When the program is executed, the processes of the methods in the embodiments are performed. The storage medium may be a magnetic disk, an optical disc, a ROM, a random access memory RAM, or the like.

A sequence of the steps of the methods in the embodiments of this application may be adjusted, combined, or deleted based on an actual requirement.

The modules in the apparatus in the embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. An encoding method, comprising:
    determining a first encoding quantization parameter QP;
    precoding a to-be-encoded block by using the first encoding QP to obtain precoding result information;
    adjusting the first encoding QP based on the precoding result information to obtain a second encoding QP; and
    performing encoding on the to-be-encoded block by using the second encoding QP.

2. The method according to claim 1, wherein precoding the to-be-encoded block comprises:
    precoding the to-be-encoded block by using the first encoding QP in each of a plurality of prediction modes to obtain precoding result information corresponding to each prediction mode;
    before adjusting the first encoding QP based on the precoding result information, the method further comprises:
    selecting an optimal prediction mode from the plurality of prediction modes;
    adjusting the first encoding QP comprises:
    adjusting the first encoding QP based on encoding result information corresponding to the optimal prediction mode to obtain the second encoding QP; and
    performing encoding on the to-be-encoded block comprises:
    performing encoding on the to-be-encoded block by using the second encoding QP in the optimal prediction mode.

3. The method according to claim 2, wherein before determining the first encoding QP, the method further comprises:
    selecting at least one optimal spatial-domain prediction mode from a plurality of spatial-domain prediction modes, and selecting at least one optimal frequency domain prediction mode from a plurality of frequency domain prediction modes, wherein the at least one optimal spatial-domain prediction mode has a smallest encoding cost in the plurality of spatial-domain prediction modes, the at least one optimal frequency domain prediction mode has a smallest encoding cost in the plurality of frequency domain prediction modes, and the different optimal spatial-domain prediction modes and the optimal frequency domain prediction modes correspond to different prediction reference directions and/or different prediction value calculation methods; and
    precoding the to-be-encoded block comprises:
    performing spatial-domain precoding on the to-be-encoded block by using the first encoding QP in the at least one optimal spatial-domain prediction mode; and
    performing frequency domain precoding on the to-be-encoded block by using the first encoding QP in the at least one optimal frequency domain prediction mode.

4. The method according to claim 1, wherein when precoding the to-be-encoded block by using the first encoding QP, the method further comprises: performing pixel reconstruction on the to-be-encoded block to obtain a reconstructed pixel of the to-be-encoded block in a precoding phase; and
    after precoding the to-be-encoded block, the method further comprises: precoding a next coding block of the to-be-encoded block with reference to the reconstructed pixel of the to-be-encoded block in the precoding phase.

5. The method according to claim 1, wherein precoding the to-be-encoded block comprises:
    predicting the to-be-encoded block to obtain residual information;
    quantizing the residual information by using the first encoding QP; and
    calculating an encoding cost based on the quantized residual information, wherein
    the to-be-encoded block is precoded by using the first encoding QP after the residual information is quantized by using the first encoding QP.

6. The method according to claim 1, wherein precoding the to-be-encoded block comprises:
    precoding the to-be-encoded block by using at least a reconstructed pixel of a previous coding block of the to-be-encoded block in a precoding phase as a prediction reference value and by using the first encoding QP, wherein
    the previous coding block and the to-be-encoded block are adjacent in an encoding time sequence, and an encoding time period of the previous coding block is earlier than an encoding time period of the to-be-encoded block.

7. The method according to claim 1, wherein determining the first encoding QP comprises: determining the first encoding QP based on a texture complexity of the to-be-encoded block and/or a fullness status of a bitstream buffer.

8. The method according to claim 7, wherein determining the first encoding QP includes increasing the first encoding QP to accommodate increasing texture complexity and/or increasing the first encoding QP to accommodate a fuller bitstream buffer.

9. The method according to claim 1, wherein the precoding result information comprises at least one of the following: a quantity of encoded bits of the to-be-encoded block obtained by using the first encoding QP, an encoding distortion magnitude of the to-be-encoded block obtained by using the first encoding QP, an encoding rate-distortion cost of the to-be-encoded block obtained by using the first encoding QP, a prediction residual of the to-be-encoded block, and the texture complexity of the to-be-encoded block.

10. The method according to claim 9, wherein encoding result information comprises the quantity of encoded bits of the to-be-encoded block obtained by using the first encoding QP; and
adjusting the first encoding QP based on the precoding result information comprises:
decreasing the first encoding QP when the quantity of encoded bits is less than a target quantity of bits; or
increasing the first encoding QP when the quantity of encoded bits is greater than the target quantity of bits, wherein
the target quantity of bits depends on a fullness status of a bitstream buffer and a quantity of output bits of the bitstream buffer.

11. An encoder, comprising:
a first bit rate control module, configured to determine a first encoding quantization parameter QP;
a precoding module, configured to precode the to-be-encoded block by using the first encoding QP to obtain precoding result information;
a second bit rate control module, configured to adjust the first encoding QP based on the precoding result information to obtain a second encoding QP; and
an encoding module, configured to perform real encoding on the to-be-encoded block by using the second encoding QP.

12. The encoder according to claim 11, wherein the precoding module is configured to: precode the to-be-encoded block by using the first encoding QP in each of a plurality of prediction modes to obtain precoding result information corresponding to each prediction mode;
the encoder further comprises: a selection module, configured to select an optimal prediction mode from the plurality of prediction modes;
the second bit rate control module is configured to: adjust the first encoding QP based on encoding result information corresponding to the optimal prediction mode to obtain the second encoding QP; and
the encoding module is configured to perform encoding on the to-be-encoded block by using the second encoding QP in the optimal prediction mode.

13. The encoder according to claim 12, wherein the encoder further comprises: a pre-analysis module, configured to select at least one optimal spatial-domain prediction mode from a plurality of spatial-domain prediction modes, and select at least one optimal frequency domain prediction mode from a plurality of frequency domain prediction modes, wherein the at least one optimal spatial-domain prediction mode has a smallest encoding cost in the plurality of spatial-domain prediction modes, the at least one optimal frequency domain prediction mode has a smallest encoding cost in the plurality of frequency domain prediction modes, and different prediction modes correspond to the different optimal spatial-domain prediction modes and the optimal frequency domain prediction reference directions and/or different prediction value calculation methods; and
the precoding module is configured to: perform spatial-domain precoding on the to-be-encoded block by using the first encoding QP in the at least one optimal spatial-domain prediction mode; and
perform frequency domain precoding on the to-be-encoded block by using the first encoding QP in the at least one optimal frequency domain prediction mode.

14. The encoder according to claim 11, further comprising a pixel reconstruction module, configured to: when the precoding module precodes the to-be-encoded block by using the first encoding QP, perform a pixel reconstruction on the to-be-encoded block to obtain a reconstructed pixel of the to-be-encoded block in a precoding phase; and
the precoding module is further configured to precode a next coding block of the to-be-encoded block with reference to the reconstructed pixel of the to-be-encoded block in the precoding phase.

15. The encoder according to claim 11, wherein the precoding module comprises:
a prediction unit, configured to predict the to-be-encoded block to obtain residual information;
a quantization unit, configured to quantize the residual information by using the first encoding QP; and
a cost calculation unit, configured to calculate an encoding cost based on the quantized residual information, wherein
the to-be-encoded block is precoded by using the first encoding QP after the residual information is quantized by using the first encoding QP.

16. The encoder according to claim 11, wherein the precoding module is configured to precode the to-be-encoded block by using at least a reconstructed pixel of a previous coding block of the to-be-encoded block in a precoding phase as a prediction reference value and by using the first encoding QP, wherein
the previous coding block and the to-be-encoded block are adjacent in an encoding time sequence, and an encoding time period of the previous coding block is earlier than an encoding time period of the to-be-encoded block.

17. The encoder according to claim 11, wherein the first bit rate control module is configured to determining the first encoding QP based on a texture complexity of the to-be-encoded block and/or a fullness status of a bitstream buffer.

18. The encoder according claim 11, wherein the precoding result information comprises at least one of the following: a quantity of encoded bits of the to-be-encoded block obtained by using the first encoding QP, an encoding distortion magnitude of the to-be-encoded block obtained by using the first encoding QP, an encoding rate-distortion cost of the to-be-encoded block obtained by using the first encoding QP, a prediction residual of the to-be-encoded block, and the texture complexity of the to-be-encoded block.

19. The encoder according to claim 18, wherein the encoding result information comprises the quantity of encoded bits of the to-be-encoded block obtained by using the first encoding QP; and the second bit rate control module is configured to adjust the first encoding QP based on the precoding result information by:

decreasing the first encoding QP when the quantity of encoded bits is less than a target quantity of bits; or increasing the first encoding QP when the quantity of encoded bits is greater than the target quantity of bits, wherein the target quantity of bits depends on a fullness status of a bitstream buffer and a quantity of output bits of the bitstream buffer.

* * * * *

UNITED STATES PATENT AND TRADEMARK OFFICE
CERTIFICATE OF CORRECTION

PATENT NO. : 12,388,987 B2
APPLICATION NO. : 17/855220
DATED : August 12, 2025
INVENTOR(S) : Junkai Feng et al.

It is certified that error appears in the above-identified patent and that said Letters Patent is hereby corrected as shown below:

In the Claims

In Column 36, Claim 18, Line 1, delete "according claim" and insert -- according to claim --, therefor.

Signed and Sealed this
Twenty-third Day of December, 2025

John A. Squires
*Director of the United States Patent and Trademark Office*